United States Patent [19]

Wohlhüter

[11] Patent Number: 5,346,239
[45] Date of Patent: Sep. 13, 1994

[54] TRACTOR TRAIN, OPTIONALLY AN ARTICULATED TRAIN

[75] Inventor: Gerhard Wohlhüter, München, Fed. Rep. of Germany

[73] Assignee: Rockinger Spezialfabrik fur Anhangerkupplungen GmbH & Co., Munich, Fed. Rep. of Germany

[21] Appl. No.: 967,695

[22] Filed: Oct. 27, 1992

[30] Foreign Application Priority Data

Oct. 30, 1991 [DE] Fed. Rep. of Germany ....... 4135795
Aug. 14, 1992 [EP] European Pat. Off. ........ 92113933.3

[51] Int. Cl.⁵ ............................................. B60D 1/62
[52] U.S. Cl. ................................... 280/420; 280/422
[58] Field of Search ............... 280/420, 421, 422, 433, 280/423.1, 477

[56] References Cited

U.S. PATENT DOCUMENTS

| | | | |
|---|---|---|---|
| 2,457,478 | 12/1948 | Letvin | 280/33.05 |
| 2,480,413 | 8/1949 | Kirksey | 280/33.05 |
| 2,513,651 | 7/1950 | Kirksey | 280/421 |
| 3,391,950 | 7/1968 | Carter | 280/421 |
| 3,628,811 | 12/1971 | Rivers | 280/421 |
| 3,888,513 | 6/1975 | Pilz et al. | 280/421 |
| 4,577,885 | 3/1986 | Breu | 280/508 |
| 4,943,079 | 7/1990 | Harbold | 280/420 |
| 5,044,653 | 9/1991 | Savanella | 280/421 |

FOREIGN PATENT DOCUMENTS

| | | | |
|---|---|---|---|
| 1095132 | 12/1960 | Fed. Rep. of Germany . | |
| 1455466 | 12/1968 | Fed. Rep. of Germany . | |
| 2039310 | 2/1971 | Fed. Rep. of Germany . | |
| 2641502 | 7/1990 | France | 280/421 |
| 145012 | 11/1980 | Japan | 280/420 |
| 2204844 | 11/1988 | United Kingdom . | |
| 2209507 | 5/1989 | United Kingdom | 280/420 |

Primary Examiner—Margaret A. Focarino
Assistant Examiner—Kevin Hurley
Attorney, Agent, or Firm—Brumbaugh, Graves, Donohue & Raymond

[57] ABSTRACT

In the case of an articulated train, there is between the two partial vehicles, that is to say the tractor vehicle (10) and the trailer vehicle (22), a supply coupling (32, 54) which closes automatically when the two partial vehicles are coupled together and opens automatically when the two partial vehicles are separated from each other (FIG. 1).

41 Claims, 13 Drawing Sheets

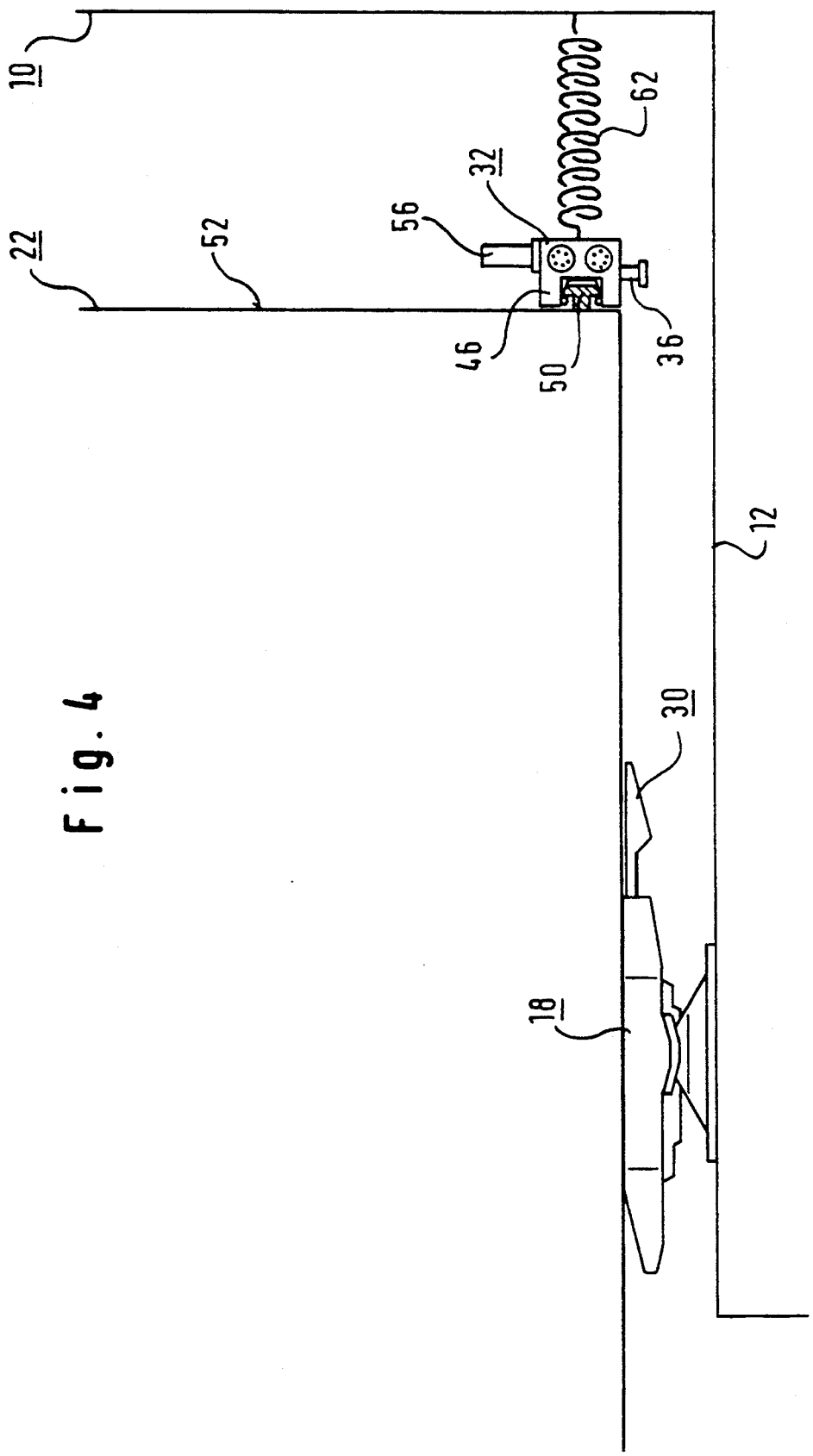

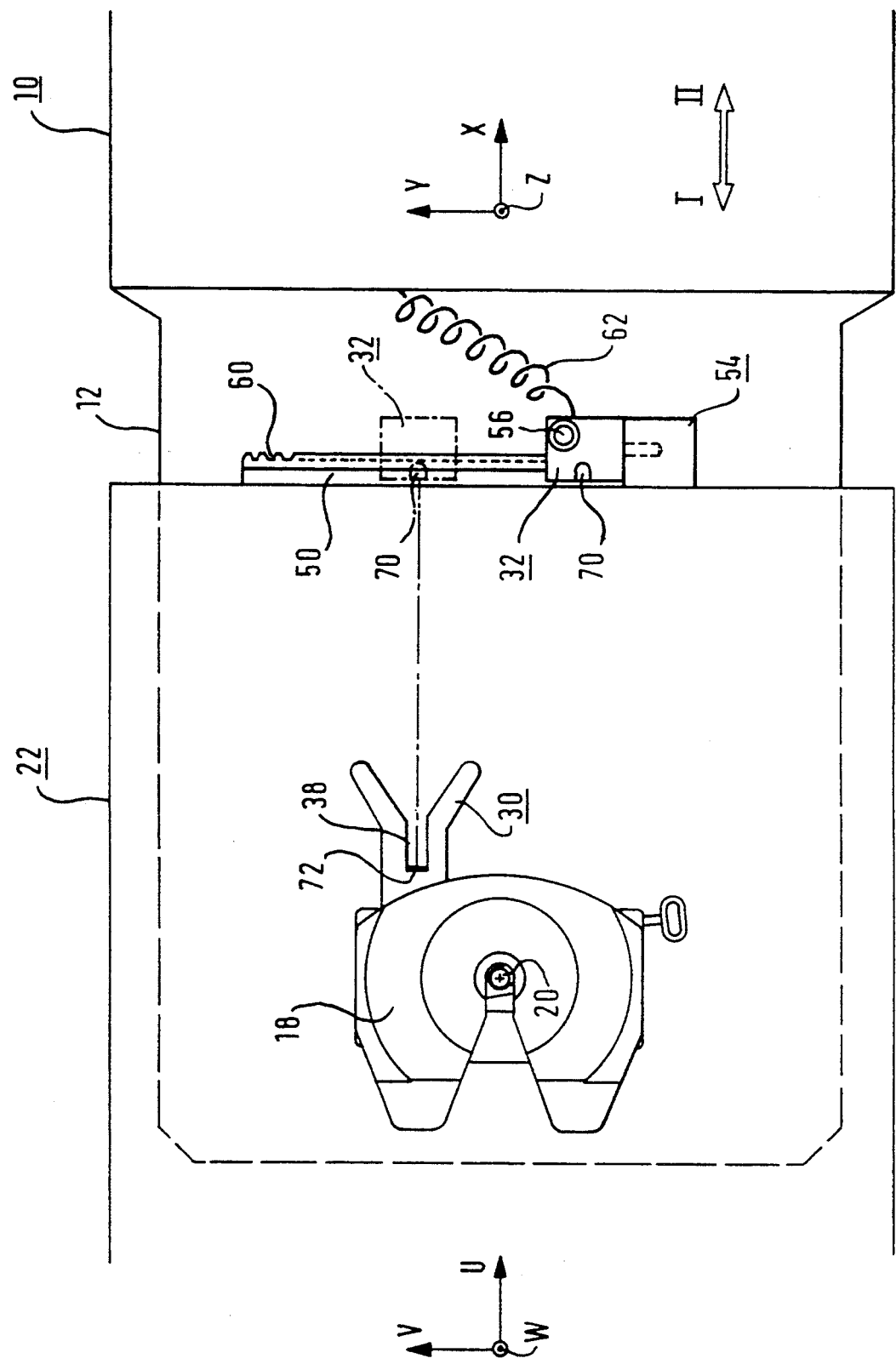

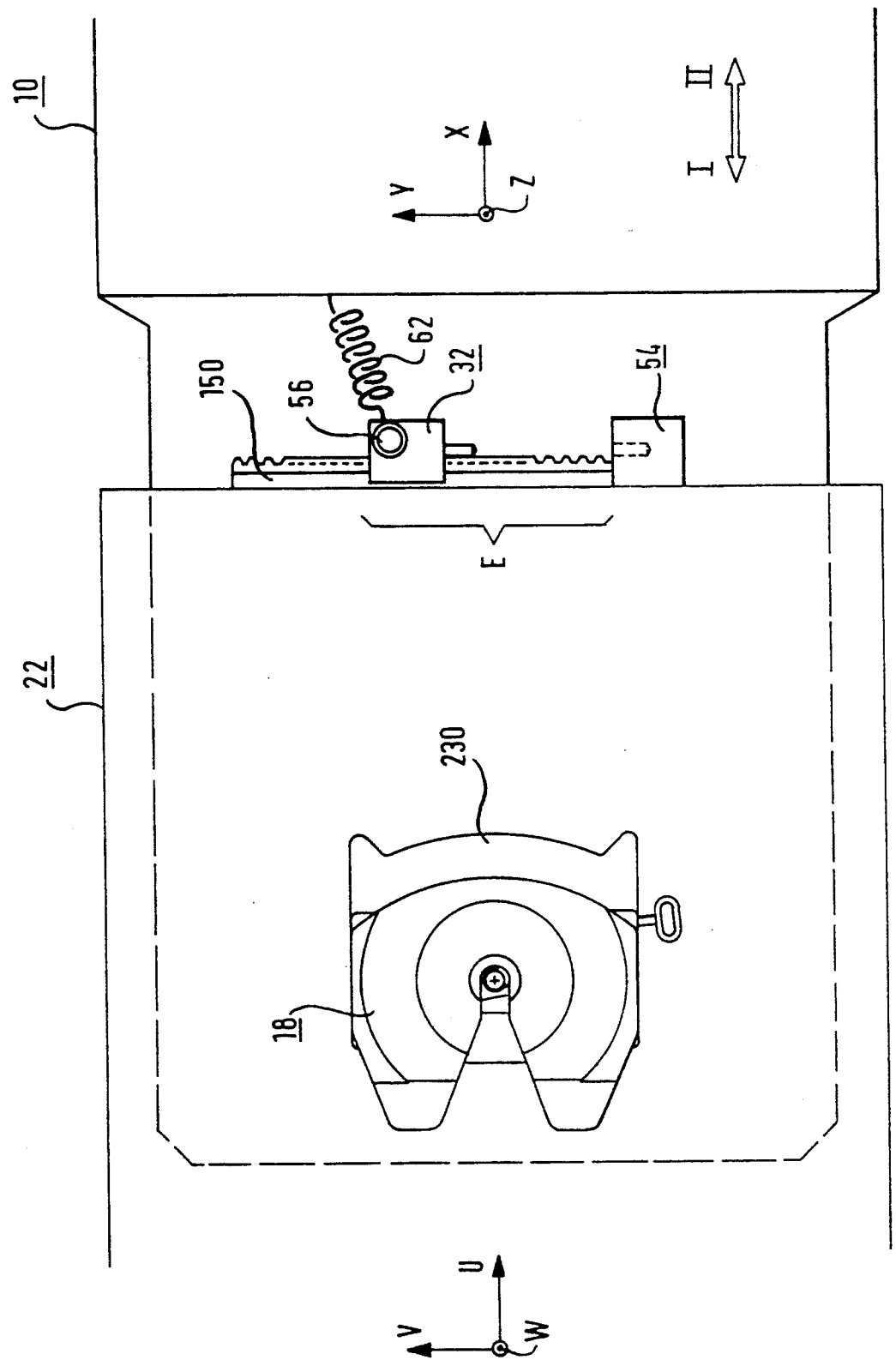

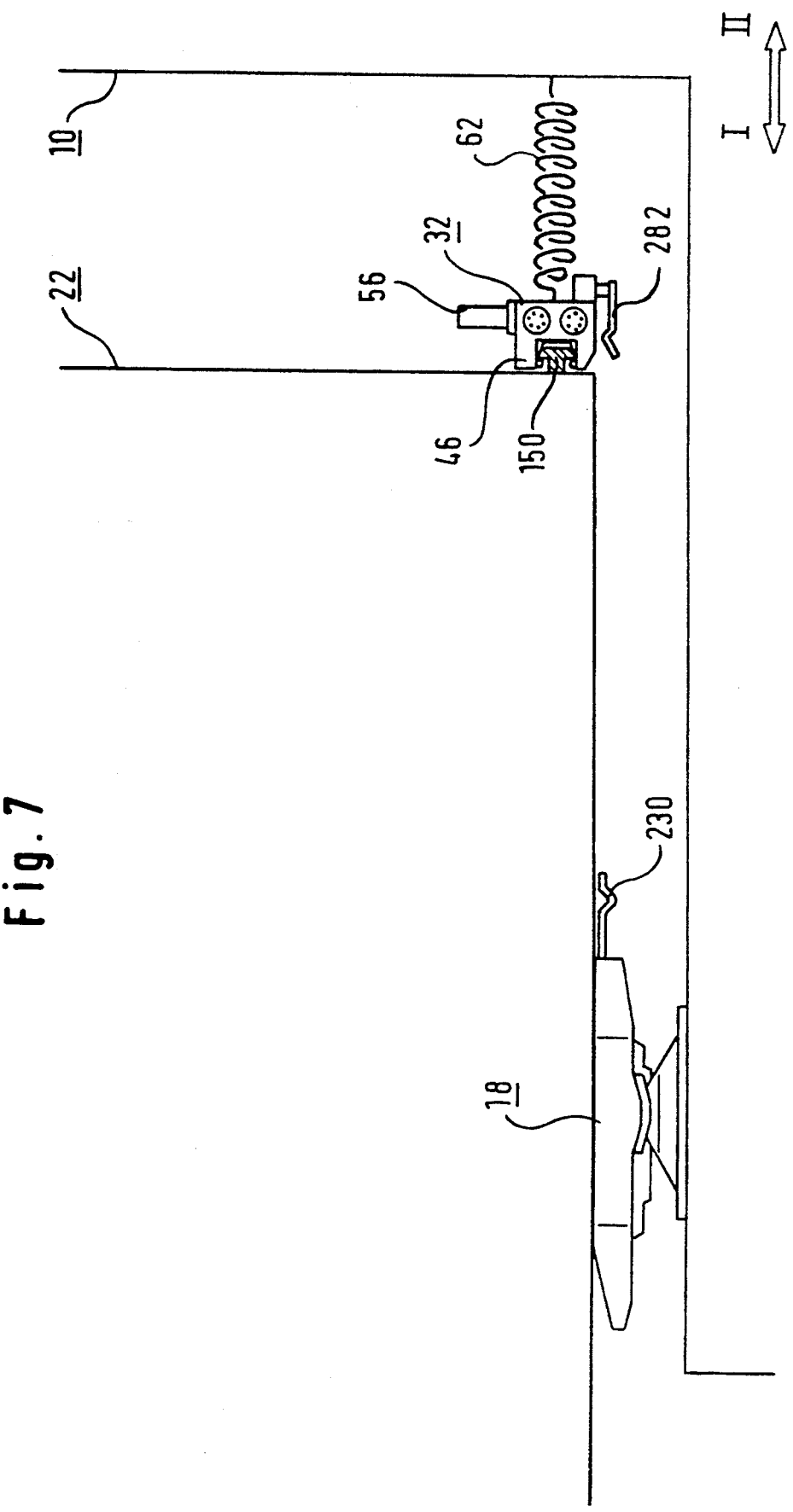

TRACTOR TRAIN, OPTIONALLY AN ARTICULATED TRAIN

BACKGROUND OF THE INVENTION

The invention relates to a tractor train, optionally an articulated train, comprising a road-going tractor vehicle with a longitudinal axis, a transverse axis and a vertical axis (hereinafter referred to as: tractor-side longitudinal axis, tractor-side transverse axis, tractor-side vertical axis), a road-going trailer vehicle with a longitudinal axis, a transverse axis and a vertical axis (hereinafter referred to as: trailer-side longitudinal axis, trailer-side transverse axis, trailer-side vertical axis), a tractor coupling, optionally an articulated coupling to produce, articulated about a coupling axis parallel with the vertical axis, a push-and-pull connection between the two partial vehicles: tractor vehicle and trailer vehicle, a supply coupling between the two partial vehicles h a coupling half on the tractor vehicle side (hereinafter referred to as the tractor-side coupling half) an d a coupling half on the trailer vehicle side (hereinafter referred to as the trailer-side coupling half), of which coupling halves at least one first coupling half is connected to a supply unit of the respective partial vehicle by a flexible supply line and, when the coupling is engaged with the respective second coupling half, is adapted for movement in relation to the respective partial vehicle in such a way that relative pivoting movements of the partial vehicles about the coupling axis are not substantially impeded.

The term 'supply coupling' is understood to mean a coupling between two portions of a line which is intended and is suitable for feeding to the trailer vehicle electric current or/and control commands or/and fluid flows for all manner of functions, e.g. lighting functions, braking functions, dumper operation and the like from a supply means disposed on the tractor vehicle. In this respect, it is basically conceivable to provide a plurality of supply lines and a corresponding number of supply couplings to convey the various media. However, for the sake of simplified handling, it is preferable to combine as many supply lines as possible into one single cable or hose loop in order that all the necessary supply lines should be functionally efficient by coupling one single or just a few supply couplings.

STATEMENT OF THE PRIOR ART

Where prior art tractor trains and optionally articulated trains are concerned, the supply coupling is coupled by hand. For this, is necessary for the operator to proceed from the driver's seat into the area of the front wall of the semitrailer to couple tube two coupling halves together.

OBJECT OF THE INVENTION

The invention addresses the problem of so developing and disposing a supply coupling on an arcticulated train that the two coupling halves positively enter into engagement when the tractor vehicle is brought into a push-and-pull connection with the trailer vehicle by the articulating coupling.

SUMMARY OF THE INVENTION

In order to resolve this problem, it is according to the invention proposed that one of the two coupling halves be operatively rigidly disposed on the associated one of the two partial vehicles, that the other coupling half be connected by a flexible supply line to the supply unit of the other partial vehicle, and on the other partial vehicle is a positioning means which positions the other coupling half in a ready-for-capture position, when the partial vehicles are separated, and on the one partial vehicle there is a catch device to trap the other coupling half, wherein the catch device, during an approach operation between the two martial vehicles, trapping the other coupling half which is positioned in the ready-for-capture position, moving it into a catch position in relation to the one partial vehicle, either this catch position being a coupling position corresponding to a coupling-engaged condition between the two coupling halves or this catch position being the starting point of a transport path provided on the one partial vehicle and on which the other coupling half can be moved from the catch position into a coupling position corresponding to the coupling-engaged condition, and in the coupling-engaged condition of the two coupling halves, the positioning means guaranteeing the other coupling half at least the freedom of movement in relation to the other partial vehicle necessary for the relative pivoting movements of the two partial vehicles.

The positive connection of the two coupling halves of the supply coupling is of considerable advantage especially when the establishment of the push-and-pull connection between tractor vehicle and trailer vehicle is assisted and checked in the conventional manner by an observer present at the location of the articulating coupling. The positive connection of the supply coupling halves becomes especially significant when, by the use of corresponding remote observation means and remote actuating means, it is possible for the push-and-pull connection between the two partial vehicles, i.e., between the tractor vehicle and the trailer vehicle, to be made from the driver's seat. The driver can then remain seated in the driver's cabin, from which position he is able to perform all the measures necessary in connection with making up the articulated train.

In accordance with a preferred embodiment of the invention, the trailer-side coupling half is operatively rigidly disposed on the trailer vehicle, and the tractor-side coupling half is connected by a flexible supply line to the supply unit of the tractor vehicle and there are on the tractor vehicle positioning means which position the tractor-side coupling half in a ready-for-capture position, when the tractor vehicle and the trailer vehicle are separated, and there is on the trailer vehicle a catch device for the tractor-side coupling half the catch device during an approach operation between the two partial vehicles trapping the tractor-side coupling half which is positioned in the ready-for-capture position into a catch position in relation to the trailer vehicle, and furthermore either this catch position corresponding to the coupling-engaged condition between the two coupling halves or this catch position being the starting point of a transport path provided on the trailer vehicle and on which the tractor-side coupling half can be moved from the catch position into a coupling position corresponding to the coupling-engaged condition between the two coupling halves, and in the coupling condition of the two coupling halves the positioning means guarantees the tractor-side coupling half at least the freedom of movement in relation to the tractor vehicle necessary for relative pivoting movement of the two partial vehicles.

The first alternative embodiment which is indicated above, and in which the catch position corresponds to the coupling-engaged condition between the two coupling halves, can be achieved for practical purposes in that as the tractor vehicle and the trailer vehicle move towards each other, the two coupling halves are brought close to each other and are positively connected to each other during the course of this approaching movement. This possibility, which at first sight seems to be particularly simple, does however entail the problem that it requires accurate maintenance of a predetermined direction of approach of tractor vehicle and trailer vehicle, so that the coupling halves meet and can be coupled to each other. For this reason, it will often be necessary to resort to the other alternative in which the catch position is the starting position of a transport path which is provided on the trailer vehicle, on which the tractor side coupling half can be moved from the catch position into a coupling position which corresponds to the coupling-engaged condition between the two coupling halves. In the case of this alternative arrangement, there is no need to observe a specific direction of approach between the partial vehicles. In fact, the catch position may vary as desired along the transport path because in order to establish the coupling-engaged condition, it is in any case necessary for the coupling half which is trapped by the catch device to perform a movement and the length of the transport path which has to be negotiated in any particular instance may be variable.

In order also to allow the two coupling halves of the supply coupling to be separated when the tractor vehicle is uncoupled from the trailer vehicle, it is furthermore suggested that the catch device be constructed for positive release of the other coupling half while positioning means be constructed for positive re-positioning of the other coupling half in the ready-for-capture position during the course of a process of separation between the two partial vehicles.

Applied to the alternative, where there is a transport path between the coupling position and the catch position of the other coupling half, it is proposed that for the preparation for separation from the catch device, this other coupling half can be returned along the transport path into a release position, possibly corresponding to the catch position, from which it is possible to re-position the other coupling half in the ready-for-capture position.

The fact that the release position need not necessarily coincide with the catch position is due to the fact that one must allow for the possibility of a different reciprocal orientation of tractor vehicle and trailer vehicle during a coupling process and a subsequent separation process.

It is recommended that when the two partial vehicles are approaching each other or being separated from each other, the respective other coupling half should be capable of moving together with the catch device along a partial path in the longitudinal direction of and in relation to the other partial vehicle. This measure means particularly that, due to the approach of the two partial vehicles, it is possible, for the respective other coupling half to be moved out of the ready-for-capture position in which its facility for movement is possibly limited by the positioning means, into a working position in which it can no longer or does not substantially hinder the relative pivoting movement of tractor vehicle and trailer vehicle. On the other hand, the return of the other coupling half from the position assumed in operation and relative to the associated partial vehicle is utilised in order to bring this other coupling half back into the area of effect of the positioning means. In other words, it is possible during its joint movement with the catch device, for the other coupling half to be separated from the ready-for-capture position determined by the positioning means in the event of the two partial vehicles approaching each other and returned to the ready-for-capture osition as it moves jointly with the catch device in the event of the two partial vehicles being separated.

Between the catch device and the other coupling half, it is possible for there to be a snap-action connection which snaps into engagement when the two partial vehicles move towards each other and out of engagement, when the two partial vehicles are separated. Furthermore, between the positioning means and the other coupling half there may be a second snap-action connection which is disengaged as the two partial vehicles are moved towards each other and engaged when they are separated.

If two such snap-action connections are provided, then care must be taken to see that the first snap-action connection and the second snap-action connection are so attuned to each other that if the two partial vehicles approach each other, the first snap-action connection engages before the second disengages and to ensure that, when the two partial vehicles are separated, the second snap-action connection engages before the first disengages.

The first snap-action connection may be provided for instance between a catch bar of the catch device and a U-shaped part of the other coupling half which encompasses the catch bar. This is particularly advantageous with regard to the movement of the other coupling half between the catch position and the coupling position which is to be described in greater detail hereinafter, because then the catch bar can be the basis of the path of movement and the snap-action connection can be maintained over the entire path of movement along the catch bar.

The positioning means may consist for example of a fork-shaped positioning member on the other partial vehicle, in which case then, on the other coupling half, there can be a fork-engaging member which emerges from the fork as the partial vehicles move together and engages the fork as they are separated. In the case of such a fork arrangement, if it is intended to have a second snap-action connection, then this can be disposed between the positioning means and the fork-engaging rod, substantially with a wedge-shaped profile of the positioning fork extending at a right-angle to the plane of the fork and, sliding on this wedge-shaped profile, a resiliently withdrawable wedge-engaging head on the fork-engaging rod, Should it seem necessary in view of limited space availability or/and in order to protect the fork-engaging nod from mechanical damage, then it is possible when the fork-engaging rod is not in use for it to be retractable into a space-saving inoperative position.

For both snap-action connections, it is basically true that they can be constructed with resiliently yielding snap-action studs, the particular form of the studs being so chosen that as the two partial vehicles approach each other the first snap-action connection engages before the second disengages and so that as the two partial vehicles are separated the second snap-action connection engages before the first disengages. On the other hand, it is also possible for at least one of the "snap-action connections" to be electrically controlled.

Regardless of the particular direction in which the partial vehicles may be approaching each other, in order to be able to facilitate the trapping of the other coupling half by the catch device, it is possible for the catch device or/and the other coupling half to be constructed with inclined guide surfaces.

On the other hand, during the separation of the tractor vehicle from the trailer vehicle, in order to facilitate re-insertion of the other coupling half into operative connection with the positioning means and thus its return to the ready-for-capture position, it is possible for the positioning means or/and the other coupling half to have inclined guide surfaces.

Basically, it is possible for the other coupling half, when in the ready-for-capture position in which it is taken over by the catch device, to be completely isolated mechanically from the associated partial vehicle. Consequently, any hindrance to the articulating movement between tractor vehicle and trailer vehicle during travel is impossible. However, a comparably good result can also be achieved if the positioning means comprise a linkage in the form of a telescopic bar, a scissors unit, a four-bar linkage, a roll-on spring strip or, the like, to support the other coupling half and which is adapted to move in a plane parallel with the tractor-side longitudinal axis and the tractor-side transverse axis. Thanks to its mobility, this linkage can also be retained in the said parallel plane during travelling. On the other hand, a group of flexible pre-tensioning means may bias this linkage in the sense of seeking to move the other coupling half towards the ready-for-capture position. Even if the other coupling half is not mounted on a linkage which has a carrying function, then with an eye to problem-free guidance of the other coupling half between the ready-for-capture position and the catch position, it is conceivable for the other coupling half to be guided on the other partial vehicle by a straight guide arrangement which has no supporting function but which is pivotable in a plane orthogonal with the vertical axis of the other partial vehicle.

In order to guarantee a problem-free catching of the other coupling half by the catch device even when the two partial vehicles are not aligned with each other along their longitudinal axes as they approach, it is recommended that the other coupling half, when in the ready-for-capture position, should be mounted to pivot about an adjustment axis parallel with the tractor-side vertical axis, possibly while being pre-tensioned to assume an angular inoperative position.

For the above-mentioned alternative embodiment in which the other coupling half is accommodated in the catch device in a catch position other than the coupling position and subsequently has to be moved along the transport path and into the coupling position, it is envisaged that the other coupling half be moved along the transport path under motor power. In particular, it is suggested that an electrical or fluid drive be provided on the particular part involved: "the other coupling half" or "one partial vehicle" for negotiating the transport path and which remains connected to the articulated train drive even when the two partial vehicles are separated. In principle, however, it would also be conceivable for the movement of the other coupling half on the transport path to be brought about by using the movement of the two partial vehicles towards each other as the energy source.

A particularly simple solution resides in the fact that the other coupling half is equipped with a driving motor and, driven by this latter, a pinion which, when the other coupling half enters the catch position, engages a rack which defines the path of movement. The driving motor can then be supplied by an energy supply line which is accommodated in a multiple cable or hose loop which extends constantly from the other coupling half to the supply unit of the tractor vehicle. The rack may for example be a portion of a toothed belt. This toothed belt portion can be laid on the catch bar already referred to above. Then—as has also been mentioned earlier—if the coupling half is constructed with a U-shaped part which encompasses the catch bar, then this U-shaped part can guarantee accurate guidance along the catch bar while maintaining engagement between the pinion and the rack, this engagement being possibly retained in that there is between the catch bar and the U-shaped part a snap-action connection which is retained over the entire path of movement of the U-shaped part and thus of the other coupling half as it moves along the said path.

With regard, then, to the direction of the movement path between catch position and coupling position, this will generally extend in the direction of the transverse axis of the one partial vehicle, having regard to the construction of the partial vehicles and of the articulating coupling. It is then possible for the supply coupling to be constructed as a conventional plug-in coupling, the plug-in direction being parallel with the path of movement. In order to guarantee that the two coupling halves meet without any problem and without the need for any special precision being observed when constructing the path of movement and the guide means for guiding the other coupling half along the path of movement, it is recommended that both coupling halves be provided with guide surfaces, for example in the form of a guiding mandrel and a matching guiding hole.

Controlling the motor drive for the movement in the direction of the coupling condition presents no problem. The movement of approach of the other coupling half to the one coupling half can be triggered either by limit switches when the other coupling half has been trapped by the catch device but it can however also be triggered manually by the operator seated in the driver's cabin, which is certainly less advantageous because it does not exclude the possibility of this important measure being forgotten. The other coup ling half comes to a standstill positively when it encounters the one coupling half and establishes the coupled condition. The motor can then in turn be switched off by a limit switch or may be so designed that it can be permanently loaded while stopped. Note difficult is the return travel of the driving coupling during the course of an operation to separate the two partial vehicles. This return travel must lead to a release position in the region of the transport path from which the other coupling half can move back again to the ready-for-capture position on the other partial vehicle without any problem. It is conceivable for the release position to be likened to the catch position known from the preceding coupling of the partial vehicles to each other. But then no allowance is made for the fact that the relative orientation of the longitudinal axes of the two partial vehicles may during this separation process be entirely different from the relative orientation during the preceding approach process. This error may possibly be compensated by having suitable guidance surfaces. However, it is also conceivable for the release position into which the other coupling half is to move during the course of a separation process to be determined by a position recognition system. In particular, the position recognition system may be optical position recognition system, possibly employing laser beam transmitters, laser beam reflectors and laser beam receivers. Basically, it is also conceivable for the angular adjustment between the longitudinal axes of the two partial vehicles to be ascertained by an angle measuring device, the result being used for calculation of the necessary release position of the other coupling half by means of a computer.

The correct vertical setting of the two coupling halves in relation to each other is generally no problem, because the relative vertical position of the two partial vehicles is certain to be in the region of the articulating coupling and thus also in the region of the supply coupling is or can be ensured by engagement between a saddle plate on the tractor vehicle and a supporting plate on the trailer vehicle. In spite of this, it is not out of the question for the catch device or/and the other coupling half to be capable of performing a level correcting movement in the direction of the vertical axis of the relevant partial vehicle, this level correcting movement being controllable by a level difference recognition device.

It has already been mentioned at the outset that the advantages of the development of supply coupling according to the invention are particularly significant when the driver of the tractor vehicle has an opportunity of carrying out the mechanical coupling process between the two partial vehicles from the driver's cabin by suitably positioning the tractor vehicle, even if a helper is not available at the articulating coupling in order to oversee and assist the coupling operation. It is therefore furthermore proposed that in order to establish an alignment of tractor-side and trailer-side coupling parts of the articulating coupling during the coupling process which is conducive to a correct alignment for coupling purposes, and in order to operate the articulating coupling functions, a remote recognition system or/and remote actuating system should be provided in the driver's cabin.

The remote actuating system may be constructed with electrical or fluid servo-assisted systems. The remote recognition system may be constructed with a glass fibre optic or a television camera/television receiver system so that from his position in the driver's cabin the operator can watch the screen and recognise and if necessary correct the relative position of associated coupling parts of the articulating coupling.

In order to be able to adjust the level of the partial vehicles until the saddle plate of the tractor vehicle on the one hand is resting on the supporting plate of the trailer vehicle on the other, the tractor vehicle may be equipped with a height-adjusting device for adjusting the height of the parts of the articulating coupling which are associated with it. For example, an active air suspension ma y be provided between the rear wheels of the tractor vehicle and the part of the frame which carries the articulating coupling and which, by a supply of air or by a discharge of air can be caused to correct the vertical position of the saddle plate, this being again preferably performed from the driver's seat. In addition to or as an alternative to this, the trailer vehicle may also be equipped with vertically adjustable stays or supporting legs which can under motor power be extended or shortened from the driver's seat by a remote control, which has the effect of appropriately altering the height of the supporting plate on the trailer vehicle.

It goes without saying that there should also be a facility whereby processes which can be influenced by the operator during coupling and separation of the supply coupling can be influenced from the driver's seat, in so far as there is no opportunity for influencing these processes automatically, possibly by limit switches which are actuated when the partial vehicles move towards or away from each other. At least for a period of initial use of the solution according to the invention, it may be advantageous for the coupling halves to be so constructed and disposed that they can also be brought into a mutually coupled relationship by hand. This means that a facility should be provided whereby the other coupling half can be removed from its ready-for-capture position or released from its connection with the catch device, the movement path and the one coupling half so that these coupling halves can be coupled or uncoupled by hand as desired.

As an alternative, also a redundancy solution is conceivable in that in addition to an automatic or remotely operable supply coupling a conventional supply coupling is provided which can be opened or closed by hand.

The means for positioning the other coupling half in the ready-for-capture position can basically be mounted on the associated partial vehicle in any desired manner, for example on the frame of the tractor vehicle which carries the saddle plate of the articulating coupling.

In order to simplify reciprocal adjustment in relation to the articulating coupling, it is advantageous for the means for positioning the other coupling half in the ready-for-capture position to be mounted on a coupling part of the articulating coupling, particularly on a saddle plate of the tractor vehicle.

In view of the fact that proper maintenance of the coupled condition between the two coupling..halves of the supply coupling is of greatest importance in terms of travelling safety, it can be advantageous for the coupled condition, once it has been achieved, to be additionally safeguarded and monitored. The additional safeguard can be provided by an electrically controlled interlocking system which can be actuated and monitored by the operator from his position in the driver's cab, for example it may be conceivable that in the cabin, during the process of coupling the two partial vehicles, a visual or acoustic alarm may emit a warning signal until such time as the supply coupling is properly coupled and secured.

One essential aspect of the invention is as follows: in the case of an articulating train, there is usually a possibility of aligning the heights of the tractor vehicle and the trailer vehicle in that during the course of the process whereby the tractor vehicle and the trailer vehicle are moving towards each other in order to establish a coupled condition, the trailer vehicle with its supporting plate may come to rest on the saddle plate of the tractor vehicle, be it that the trailer vehicle is lowered onto the saddle plate by a retraction of the jacks or be it that the tractor vehicle, once the two plates have moved into a superposed position, has come to bear on the underside of the supporting plate by virtue of its own air suspension. This vertical alignment can be used in order to and will facilitate the bringing together of the halves of the supply coupling. In fact, one of the two coupling halves may be vertically rigid on the associated partial vehicle while the other of the two coupling halves can be supported on the associated partial vehicle already in that vertical position in the ready-for-capture position which corresponds to the vertical position of the one coupling half when the saddle plate and the supporting plate are resting one on the other. Therefore, no compensating movement in a vertical direction is any longer needed, In order to bring the two coupling halves towards each other in a longitudinal direction, it is possible to utilise the approach movement of the partial vehicles which, in a properly aligned approach, occurs strictly in the direction of the longitudinal axis, but even in the case of a non-aligned approach of the two partial vehicles, there is a substantial movement component in the longitudinal direction. Therefore, all that is now require d is the horizontal movement which must also be negotiated independently of the relative movements of the partial vehicles, in order to establish a coupled condition between the two coupling halves. Also, in the event of a non-aligned approach, it generally requires a rotatability of the other coupling half in its ready-for-capture position, so that this other coupling half, upon encountering the other partial vehicle, by moving around the relevant vertical axis, can adapt to the transverse direction of the other partial vehicle, i.e. in a position parallel therewith.

The various features of novelty which characterise the invention are pointed out with particularity in the claims annexed to and forming a part of the disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention is explained in greater detail hereinafter with reference to examples of embodiment which are shown in the accompanying drawings, in which:

FIG. 4 is a side view of the embodiment shown in FIG. 3;

FIG. 5 is a view corresponding to FIG. 3 but in which the tractor-side coupling half has been moved out of the catch position into a coupling position while the two coupling halves have been coupled to each other;

FIG. 6 is a view corresponding to FIG. 3 but in which the positioning means are of a different configuration than in FIG. 3;

FIG. 7 is a side view of the embodiment shown in FIG. 6;

DETAILED DESCRIPTION OF PREFERRED EMBODIMENTS

Figure 1:
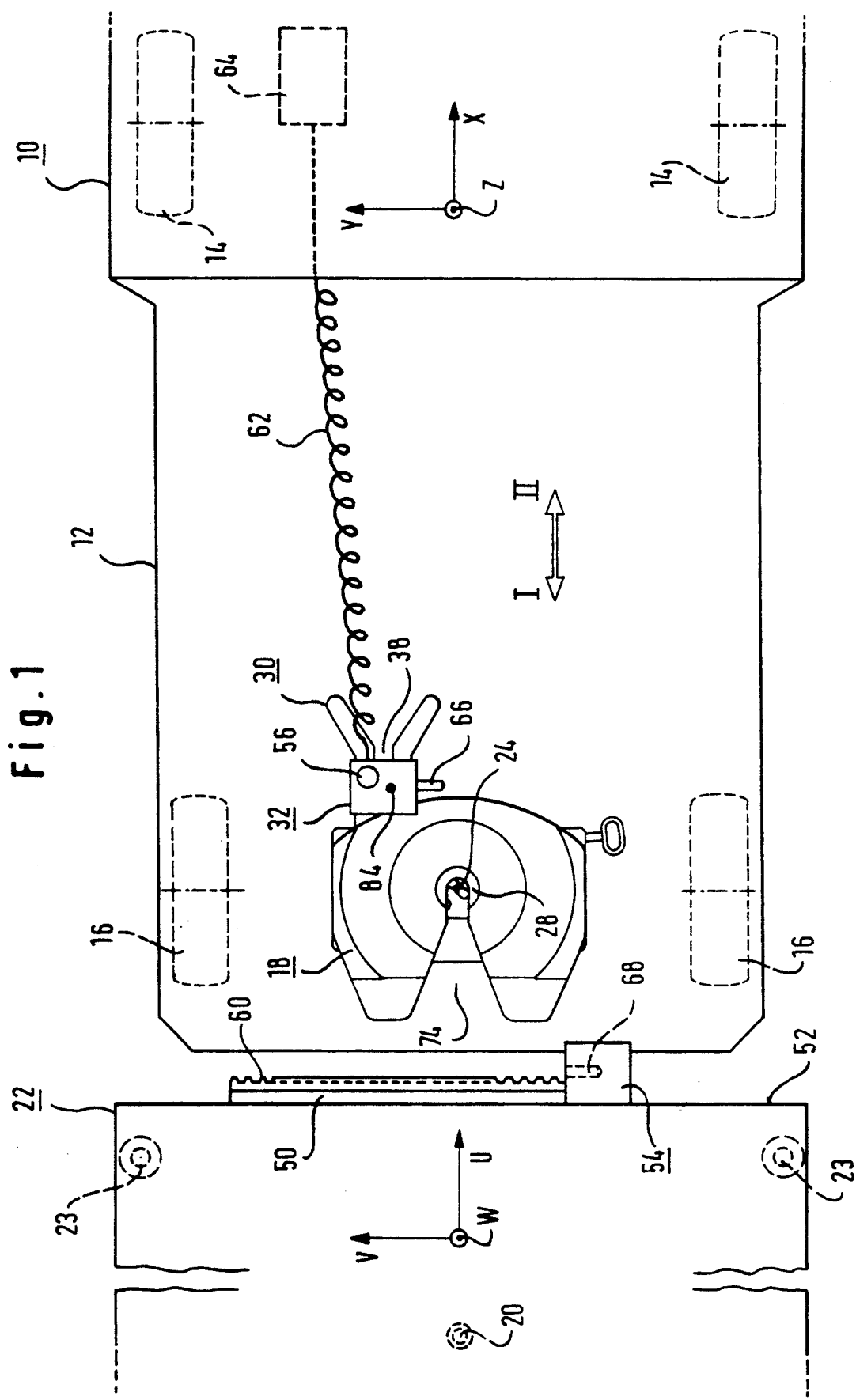
FIG. 1 is a plan view of an articulated train of which the tractor and trailer vehicles have their respective longitudinal directions aligned and can be coupled to each other by the two partial vehicles being moved towards each other.

FIG. 1 shows the tractor vehicle, in other words the semitrailer tractor of an articulated train, generally designated 10. This tractor vehicle usually runs on steerable front wheels 14 and at least one pair of rear wheels 16 supporting a chassis 12. The chassis 12 may be adapted to be raised and lowered in relation to the rear wheel pair 16 by an active air suspension. Mounted on the chassis 12 is a conventional articulating coupling plate or saddle plate 18. Together with a king pin 20 on a trailer vehicle 22, the saddle plate 18 constitutes an articulating coupling. The trailer vehicle 22 is supported at its (in the normal direction of travel) rear end by at least two equiaxial but non-steerable wheels and has in the region of its front end stays 23 which support the front end of the trailer vehicle, in other words the right-hand end in FIG. 1, on the appropriate surface when the trailer vehicle is not connected to the tractor vehicle. To facilitate the description, a system of coordinates XYZ is associated with the tractor vehicle 10 which has a longitudinal axis X on the tractor vehicle side (hereinafter referred to briefly as the tractor-side longitudinal axis X), a transverse axis Y on the tractor vehicle side (hereinafter referred to as the tractor-side transverse axis Y) and a vertical axis Z on the tractor vehicle side (hereinafter referred to as the tractor-side vertical axis Z). Furthermore, there is associated with the trailer vehicle 22 a system of coordinates UVW comprising a longitudinal axis U on the trailor vehicle side (hereinafter referred to as the trailor-side longitudinal axis U), a trailor-side transverse axis V and a trailor-side vertical axis W.

Figure 2:
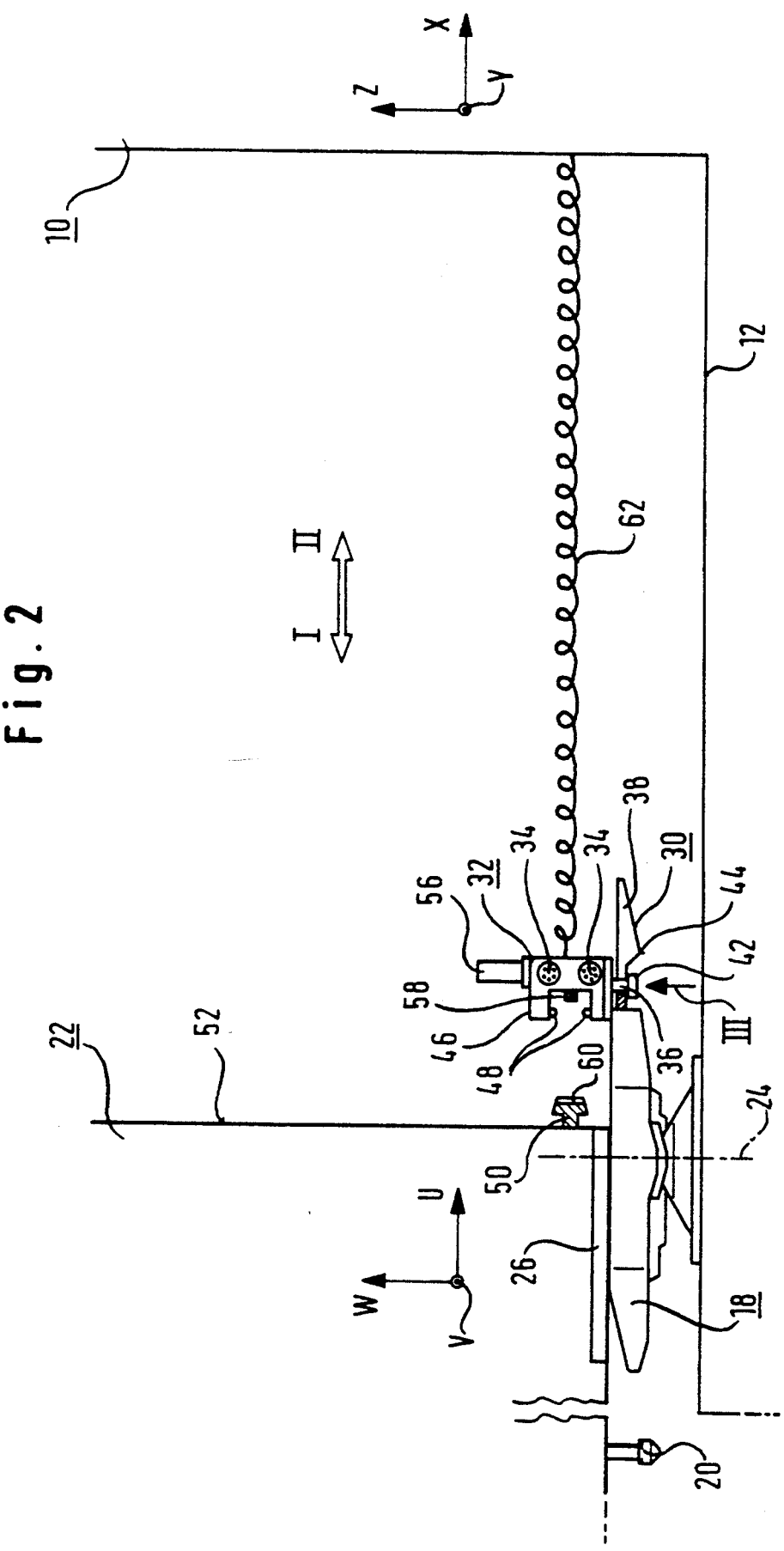
FIG. 2 is a side view of the embodiment shown in FIG. 1 in which however the two partial vehicles are already sufficiently moved towards each other in comparison with FIG. 1 that the supporting plate of the trailer vehicle is resting on the saddle plate of the tractor vehicle.
Figure 3:
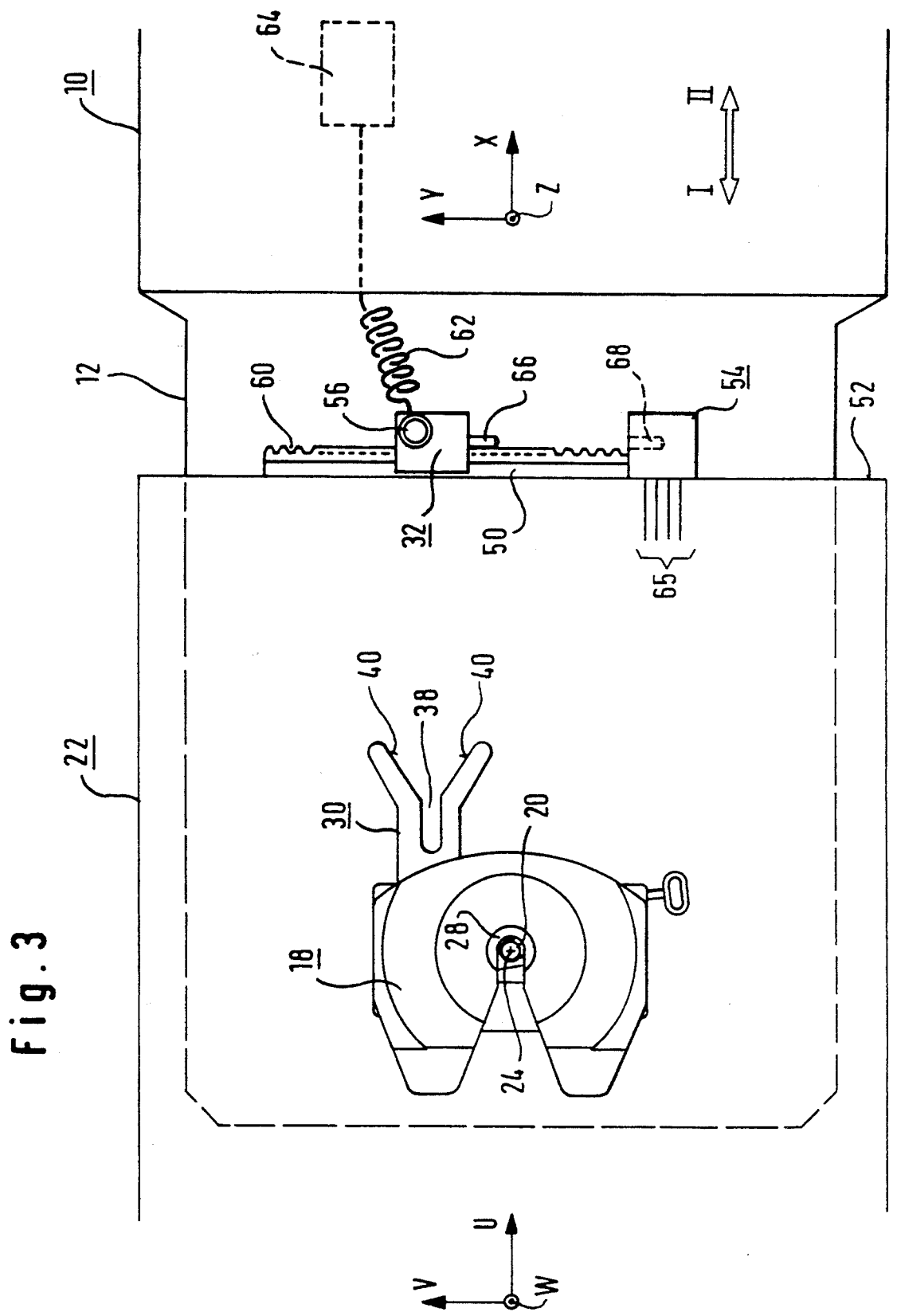
FIG. 3 is a view corresponding to FIG. 1 but in which the tractor vehicle and trailer vehicle are sufficiently close to each other that the tractor-side coupling half has moved out of the ready-for-capture position in relation to the associated positioning means and is being held in a catch position by the catch device of the trailer vehicle.

In FIG. 1, the two partial vehicles 10 and 22 have their longitudinal axes X and U in alignment, so that the coupling process can be achieved by reversing the tractor vehicle in the direction I. Then, as shown in FIG. 2, the supporting plate 26 of the trailer vehicle 22 arrives over the saddle plate 18 of the tractor vehicle 10 and finally, as shown in FIG. 3, the king pin 20 enters the lock 28 on the saddle plate 18, where it becomes interlocked, so that push-and-pull forces can be transmitted between the two partial vehicles 10 and 22 in the directions of both arrows I and II in FIG. 1. In this situation, according to FIG. 3, the two partial vehicles 10 and 22 are connected to each other and can articulate about an axis 24 of articulation which is parallel with the vertical axes Z and W.

As shown in FIGS. 1 to 3, there is on the saddle plate 18 a positioning console 30 on which a tractor-side coupling half 32 is positioned. The tractor-side half of the coupling is equipped with coupling pins 34. For positioning the tractor-side coupling half 32 on the positioning console 30 there is a fork-engaging rod 36 which is introduced into a bifurcated slot 38 on the positioning console 30 from the open end of the bifurcated slot and with the help of inclined guide surfaces 40. The fork-engaging rod 36 is pre-tensioned upwardly in the direction of the arrow III by spring pre-tensioning means not shown in the drawing, so that it seeks to enter the body of the tractor-side coupling half 32. When the fork-engaging rod 36 is pushed into the bifurcated slot 38, a head part 42 of the fork-engaging rod 36 slides along a wedge-shaped profile 44 on the underside of the positioning console 30 and then becomes locked in the position shown in FIG. 3 which will be described as the ready-for-capture position. The coupling half 32 is constructed with a U-shaped part 46 on which there are snap-action studs 48. The positioning console 30 may be constructed in one piece with the saddle plate 18.

For cooperation with the U-shaped part 46 there is mounted on the trailer vehicle a catch bar 50 which extends in the direction of the trailer-side transverse axis V and which is mounted on the front wall 52 of the trailer vehicle.

If, on a basis of the position shown in FIG. 1, the position shown in FIG. 3 is established, passing through the position in FIG. 2, then the catch bar 50 encounters the snap-action studs 48, before the king pin 20 arrives in the coupling lock 28, pushes these upwards and downwards so that they move aside flexibly and thus snap into the U-shaped part 46. Thus, the tractor-side coupling half 32 is in the catch position on the catch bar 50 which is also referred to as the catch device. If, now, starting from the position in FIG. 2, the tractor vehicle 10 moves farther backwards along the longitudinal axis X which represents the general direction of travel, then the coupling lock 28 approaches the king pin and when this happens the tractor-side coupling half 32 is pushed out of the bifurcated slot 38, the draw bar head 42 overcoming the wedge-shaped profile 44 against the spring force acting on it. Thus, the tractor-side coupling half 32 finally arrives in the position shown in FIGS. 3 and 4 in which the tractor-side coupling half 32 is completely isolated from the positioning console 30 and is still supported in the catch position by the catch bar 50.

As can be seen in FIG. 3, then, the tractor-side coupling half 32 is spaced apart from the trailer-side coupling half 54, in fact in the direction of the trailer-side transverse axis V. In order now to establish a coupled state between the two coupling halves 32 and 54, the tractor-side coupling half 32 is required to approach the trailer-side coupling half 54 by moving in the direction of the transverse axis V along the catch bar 50. To this end, there is provided in the tractor-side coupling half 32 a geared motor 56 which carries a pinion 58 for a rack (see FIG. 2). When the catch bar 50 enters the U-shaped part 46, this pinion 58 engages a toothed belt portion 60 laid on the catch bar 50.

The tractor-side coupling half is connected by a multiple line 62 to a supply unit 64 within the tractor vehicle 10. Inside the flexible multiple line 62 there are, carrying fluids and electric wires, hoses which are able to transmit all the necessary electrical and fluid feeds to the trailer vehicle 22, when the two coupling halves 32 and 54 are coupled together. If mention is made here of hoses carrying fluids, then this term must also embrace hoses which convey both gas and also liquid. In semi-trailer technology, it is usual to operate with hoses carrying compressed gas, since a compressed gas supply on the tractor vehicle is in any case available to the braking systems of the tractor vehicle and of the trailer vehicle. Within the trailer vehicle, then, these wire and fluid conducting lines may extend individually, as indicated at 65 in FIG. 3. One of the wires inside the multiple line 62 provides for the electrical drive for the geared motor 56. The geared motor is started up either by a limit switch when the catch bar 50 has entered the U-shaped part 46 or by a control command given by an operator seated in the driver's cab of the tractor vehicle. Then the tractor-side coupling half 32 is moved in the direction of the trailer-side coupling half 54 until both coupling halves are coupled together. The coupling process is further assisted by a coupling mandrel 66 which enters a coupling hole 68 on the trailer-side coupling half 54 and which centres the two coupling halves 32 and 54 in respect of each other in such a way that the coupling plugs 34 according to FIG. 2 positively enter corresponding plug-in housings in the trailer-side coupling half 54. As soon as the coupling process between the coupling halves 32 and 54 is completed, electrically operated interlocking means can be triggered by the operator seated in the driver's cabin to prevent the coupling halves 32 and 54 being separated from each other. Only then is the articulated train 10, 22 ready to roll. This state is illustrated in FIG. 5. The geared motor 56 can be stopped by a limit switch when the two coupling halves 32 and 54 are connected to each other.

If the tractor vehicle 10 is to be uncoupled again from the trailer vehicle 22, starting from the position shown in FIG. 5, in which it is ready for the road, then it is necessary firstly to release the interlocking means and move the tractor-side coupling half 32 out of the coupling position shown in solid lines in FIG. 5 into a release position shown by dash-dotted lines, in which the coupling half 32 is aligned in relation to the bifurcated slot 38 in the positioning console 30. To this end, the geared motor 56 must again be set in operation from the driver's cabin so that the tractor-side coupling half 32 in FIG. 5 moves upwardly a long the toothed belt portion 60. The dash-dotted release position of the coupling half 32 can thereby be ascertained by a laser seeking means 70 consisting of a transmitter and receiver in the region of the coupling half 32 and a reflector 72 in the region of the bifurcated slot 38. This laser seeking means may also be so constructed that it permanently seeks to establish a positioning of the coupling half 32 in the region of the longitudinal central axis of the tractor vehicle. The laser seeking means must here be understood as an example of other possible seeking arrangements, e.g. inductive seeking equipment. The attainment of the release position according to the dash-dotted detail in FIG. 5 is indicated to the operator in the driver's cabin. As soon as he receives this display, he can by remote control open the articulating coupling so that the king pin 20 is now able to emerge from the coupling lock 28. For this purpose, then, the tractor vehicle 10 is advanced in the direction of the arrow II. As can be seen in FIG. 2, the positioning console 30 now moves into the region of the fork-engaging rod 36 of the tractor-side coupling half 32. The U-shaped part 46 is initially still held on the catch bar 50 by the snap-action studs 48 and the wedge-shaped profile 44 runs over the engaging rod head 42 so that the fork-engaging rod 36 comes to rest against the inner end portion of the bifurcated slot 38 (at 72). If, now, the tractor vehicle 10 moves farther forwards in the direction of the arrow II, the positioning console 30 entrains the tractor-side coupling half 32 and the snap-action studs 48 snap out of their engagement with the catch bar 50. Consequently, the tractor-side coupling half 32 finally returns again to the ready-for-capture position shown in FIG. 1. Then, also, the king pin 20 as shown in FIG. 1 is again completely isolated from the saddle plate 18.

Of course, prior to the separation process, the trailer vehicle 22 must be supported by the stays 23, in fact in such a way that t he supporting plate 26 still, as previously, remains in contact with or in the immediate vicinity of the saddle plate 18. For this purpose, the stays 24 may be extended downwardly sufficiently by the operator seated in the driver's cab until they bear on the road surface.

It emerges from the foregoing that in order to couple the two partial vehicles 10 and 22 together and in offer to separate them, it is only necessary for there to be one man in the driver's cabin and that this man need not at any time climb out to perform actuation or monitoring tasks.

If the operator does not anyway have the ability of looking through a rear window of the driver's cabin in order to observe proper engagement of the king pin 20 into the coupling lock 28, then there is a possibility of using a television camera in order simultaneously to observe the king pin 20 and the coupling lock 28 or the entrance to the saddle plate slot 74 so that he is able to perform and monitor the shunting movement needed to connect the partial vehicles, still doing so from the driver's cabin.

Figure 5A:
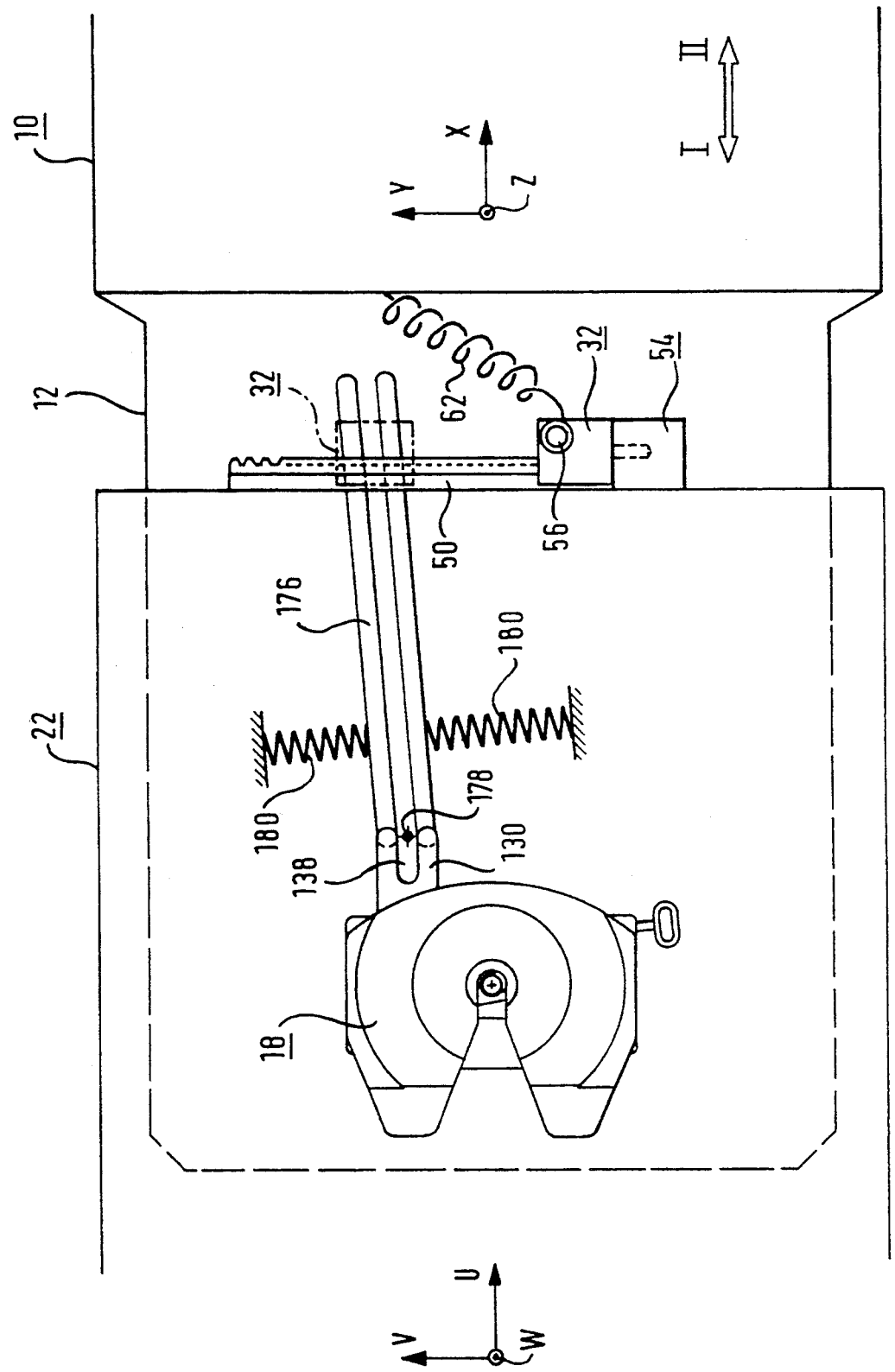
FIG. 5a is a view corresponding to FIG. 5 but in which a straight guide arrangement is provided for guiding the tractor-side coupling half.
Figure 8:
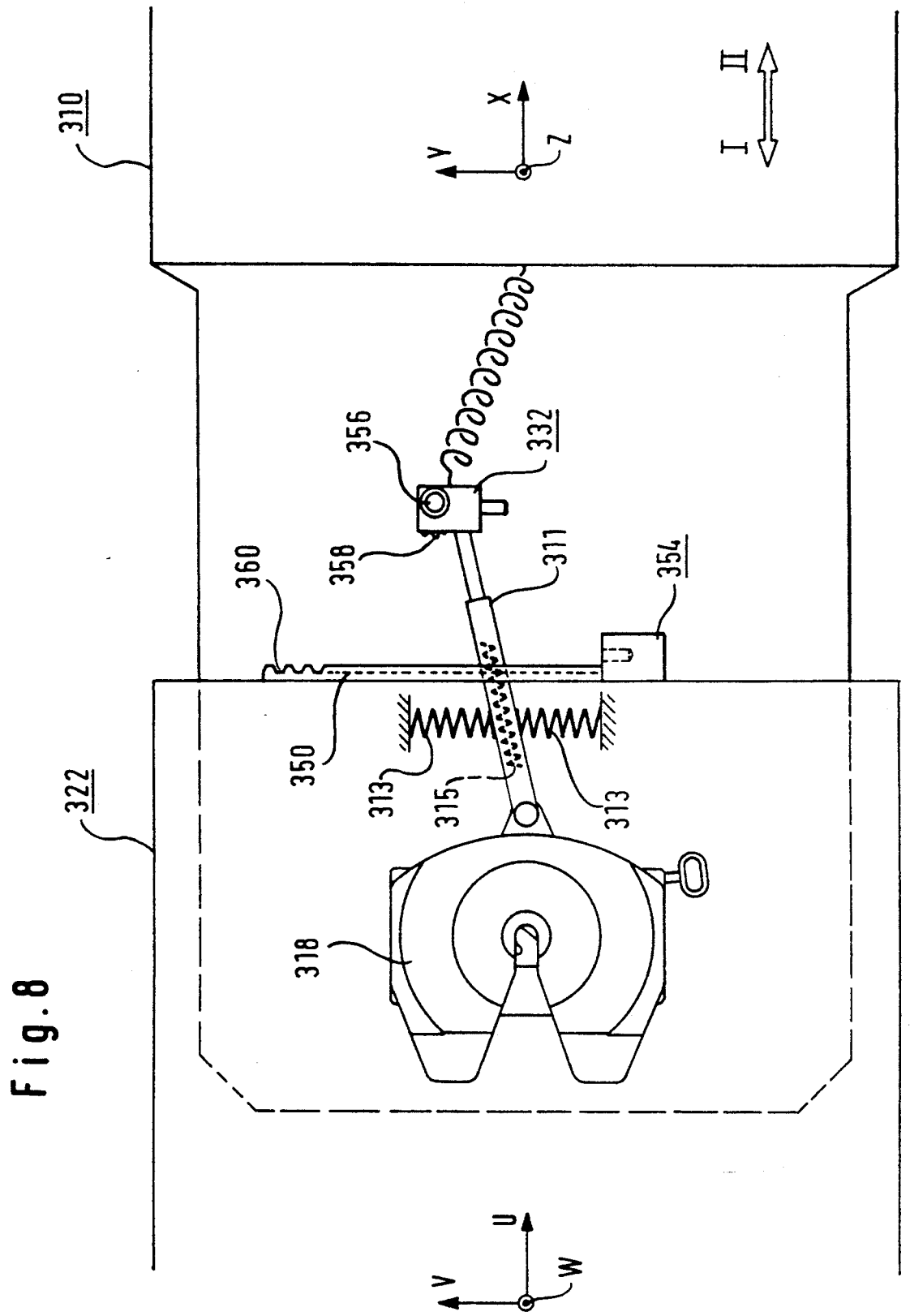
FIG. 8 is a plan view of a further embodiment of the invention, tractor vehicle and trailer having their longitudinal axes aligned but not coupled to each other, the tractor-side coupling half still being in the ready-for-capture position on the tractor vehicle.
Figure 9:
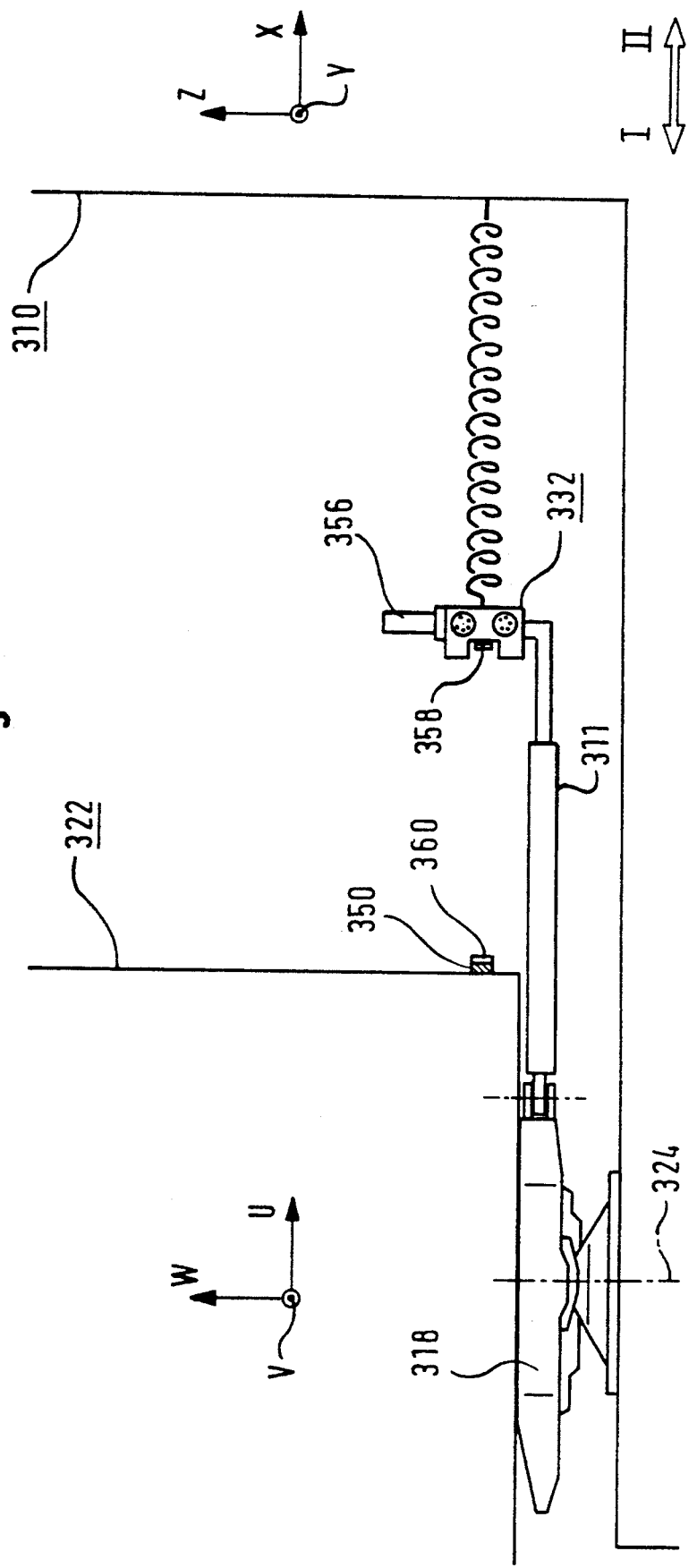
FIG. 9 is a side view of the embodiment shown in FIG. 8.

FIG. 5a shows a modified embodiment in which there is adjacent the bifurcated slot 138 of the positioning console 130 a straight guide arrangement 176 which is mounted to pivot about an axis 178 in a plane at right-angles to the vertical axis W. As shown in FIG. 2, this straight guide arrangement 176 can remain constantly in engagement with the fork-engaging rod 36 even when the tractor-side coupling half 32 is in the coupling position (indicated by solid lines in FIG. 5a) and is in the release position (shown by dash-dotted lines in FIG. 5a), The straight guide arrangement 176 is able to support the tractor-side coupling half but can also be so constructed that it only guides it, without carrying it. The straight guide edge 176 can be biased by pre-tensioning springs 180 towards a basic position, as indicated in FIG. 5a. This pre-tensioning can be used in order to bring the tractor-side coupling half 32 into the correct release position in order to prepare for a separation between the two vehicle parts 22 and 10, in which release position the coupling half 32 is positively trapped by the bifurcated slot 138 as soon as the tractor vehicle 10 moves forwards in the direction of the arrow II. The geared motor 56 can then be so controlled that it only brings about the separation of the coupling halves from each other and is then switched off, whereupon the pre-tensioning springs 180 take over the work of correctly positioning the tractor-side coupling half 32 in the release position.

FIG. 6 shows a modified form of the embodiment illustrated in FIGS. 1 to 5. Where this embodiment is concerned, the positioning console 230 is substantially wider in the transverse direction V than it is in FIG. 1. It extends over the entire width of the saddle plate 18. This means that upon separation of the two partial vehicles 22 and 10 no problems arise concerning the correct adjustment of the coupling half 32 in the release position. The coupling half 32 can be adjusted in a further adjustment range E on the catch bar 150 and is in any case encountered by the positioning console 230 when the tractor vehicle 10 moves away from the trailer vehicle 22 in the direction of the arrow II. FIG. 7 shows the profile of the positioning console 230 which cooperates with a bifurcated bracket 282 on the tractor-side coupling half 32. If, starting from the position shown in FIGS. 6 and 7, the tractor vehicle travels forwards in the direction of the arrow II, then the console 230 arrives in the bifurcated bracket 282 and snaps into engagement therein. Only upon further forward travel of the tractor vehicle in the direction of the arrow II is the U-shaped part 46 withdrawn from the catch bar 150. If on the other hand, during the course of a coupling operation, the tractor vehicle 10 is reversed in the direction of the arrow Z, then the profile of the positioning console 230 only becomes detached from the bifurcated bracket 282 after the U-shaped part 46 has engage d on the catch bar 150.

For the rest, the embodiment shown in FIGS. 6 and 7 corresponds to that shown in FIGS. 1 to 5. The embodiment shown in FIGS. 6 and 7 merits preference over that shown in FIGS. 1 to 5 because the separation of the two partial vehicles 10 and 22 is facilitated in that the tractor-side coupling half 32 can be more easily and more reliably caught by the positioning console 230.

It should further be pointed out that the tractor-side coupling half 32 in the embodiment shown in FIGS. 1 to 5a and also in the embodiment shown in FIGS. 6 and 7 is at least slightly pivotable about an axis 84 parallel with the vertical axis W, when it is on the positioning console 30, 230. This means that regardless of the relative angular position of the longitudinal axes X and U of the tractor vehicle or of the trailer vehicle, the tractor-side coupling half 32 positively bears on the catch bar 50.

In the embodiment shown in FIGS. 8 to 12, there is provided on the saddle plate 318 a positioning linkage 311 which constantly supports the tractor-side coupling half 332. Similar parts are identified by the same reference numerals as in FIGS. 1 to 5, in each case raised by the number 300. The positioning linkage is pre-tensioned by biasing springs 313 into the angular position shown in FIG. 8 and is adjusted by the inner draw spring 315 to the longitudinal setting shown in FIG. 8.

Figure 12:
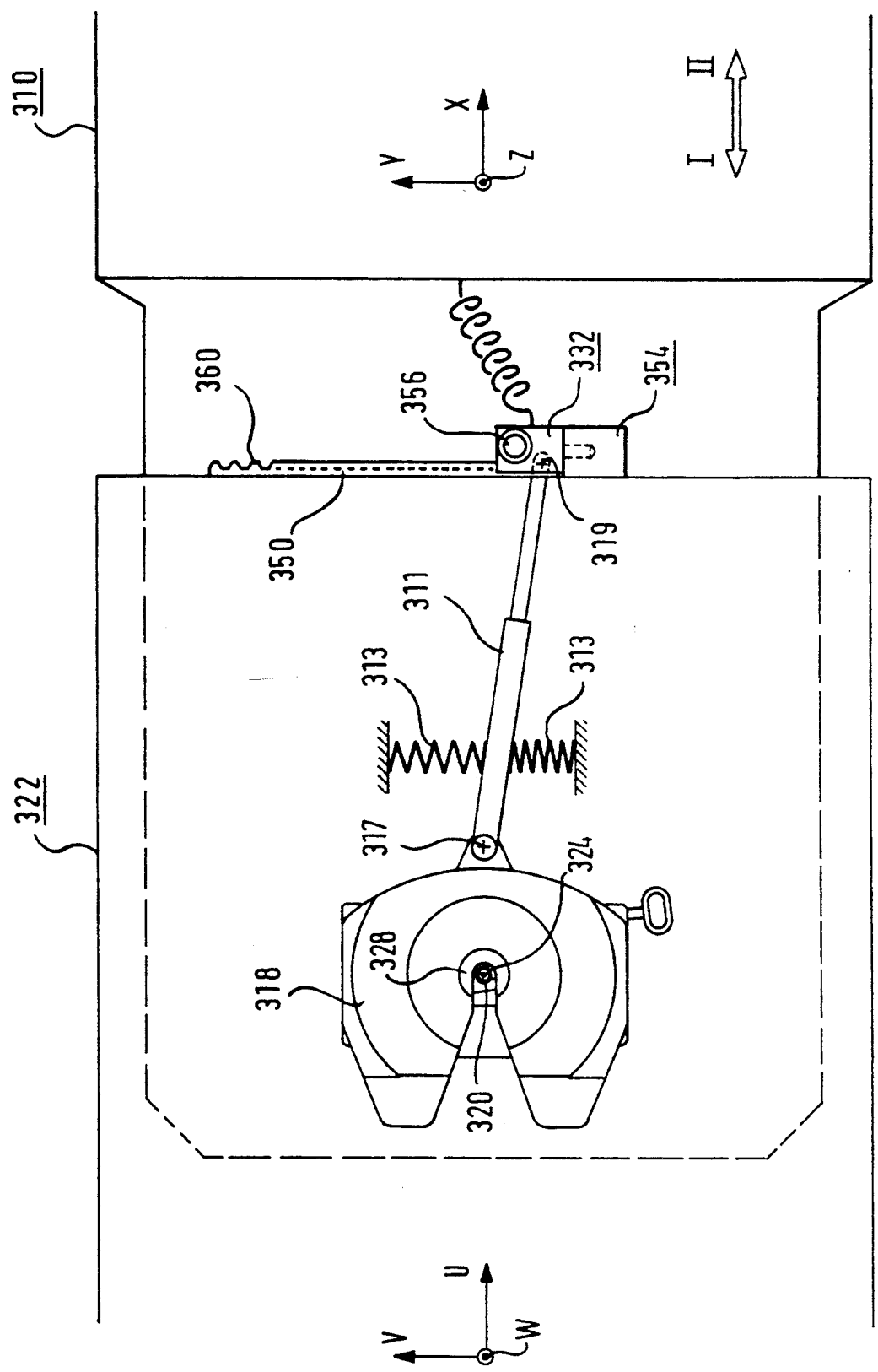
FIG. 12 is a plan view corresponding to FIG. 10, the tractor-side coupling half of the supply coupling being coupled together with the trailer-side coupling half.

When the catch bar 350 encounters the tractor-side coupling half 332, its pinion 358 again engages the toothed belt portion 360, so restoring a snap-action connection as indicated in FIG. 2 by the snap-action studs 48 and the profile of the catch bar 50. The coupling half 332 can therefore be moved out of the catch position which is indicated in FIG. 10, again by motor power, along the catch bar 350 and the toothed belt portion 360 by the geared motor 356 and the pinion 358 in the direction of engagement with the trailer-side coupling half 354. In this respect, there is no difference compared with the embodiment shown in FIGS. 1 to 5. By comparing FIGS. 8 and 10, it can be seen that when the two vehicle parts 322 and 310 move together, the telescopic linkage 311 is extended against the action of the spring 315. At the transition of the tractor-side coupling half 332 from the catch position shown in FIG. 10 into the coupling position as shown in FIG. 12, the linkage 311 is again somewhat shortened which is readily possible. In the position shown in FIG. 12, the two partial vehicles 310 and 322 are connected to each other so that they can travel jointly. The king pin 320 is received in the coupling lock 328 and the two coupling halves 332 and 354 are in the coupled state. There is no hindrance to relative pivoting of the vehicle parts 310 and 322 about the pivot axis 324 by the linkage 311, because this linkage 311 is mounted to pivot on the saddle plate 318 at 317 about a pivot axis which is parallel with the vertical axis W and is furthermore articulatingly connected to the tractor-side coupling half 332 at 319 and because finally the linkage 311 can be telescopically lengthened and shortened and is resiliently supported on the tractor vehicle 310 by the pre-tensioning springs 313.

When the tractor vehicle 310 is uncoupled from the trailer vehicle 322 it is necessary first for the tractor-side coupling half 322 to be uncoupled from the trailer-side coupling half 354, possibly after prior release from the interlocking means which safeguards the coupled condition. Once the coupling halves 332 and 354 have been separated, which means when the centring mandrel 366 is withdrawn from the centring hole 368, then the geared motor 356 can be switched off completely or set to reduced output, so that it certainly assists the movement of the linkage 311, by reason of the pre-tensioning springs 313. The linkage 311 is then positively adjusted to the position shown in FIG. 10 and merges again into the ready-for-capture position according to FIG. 8, as soon as the tractor vehicle 310 travels forwards in relation to the trailer vehicle 322 in the direction X.

Figure 10:
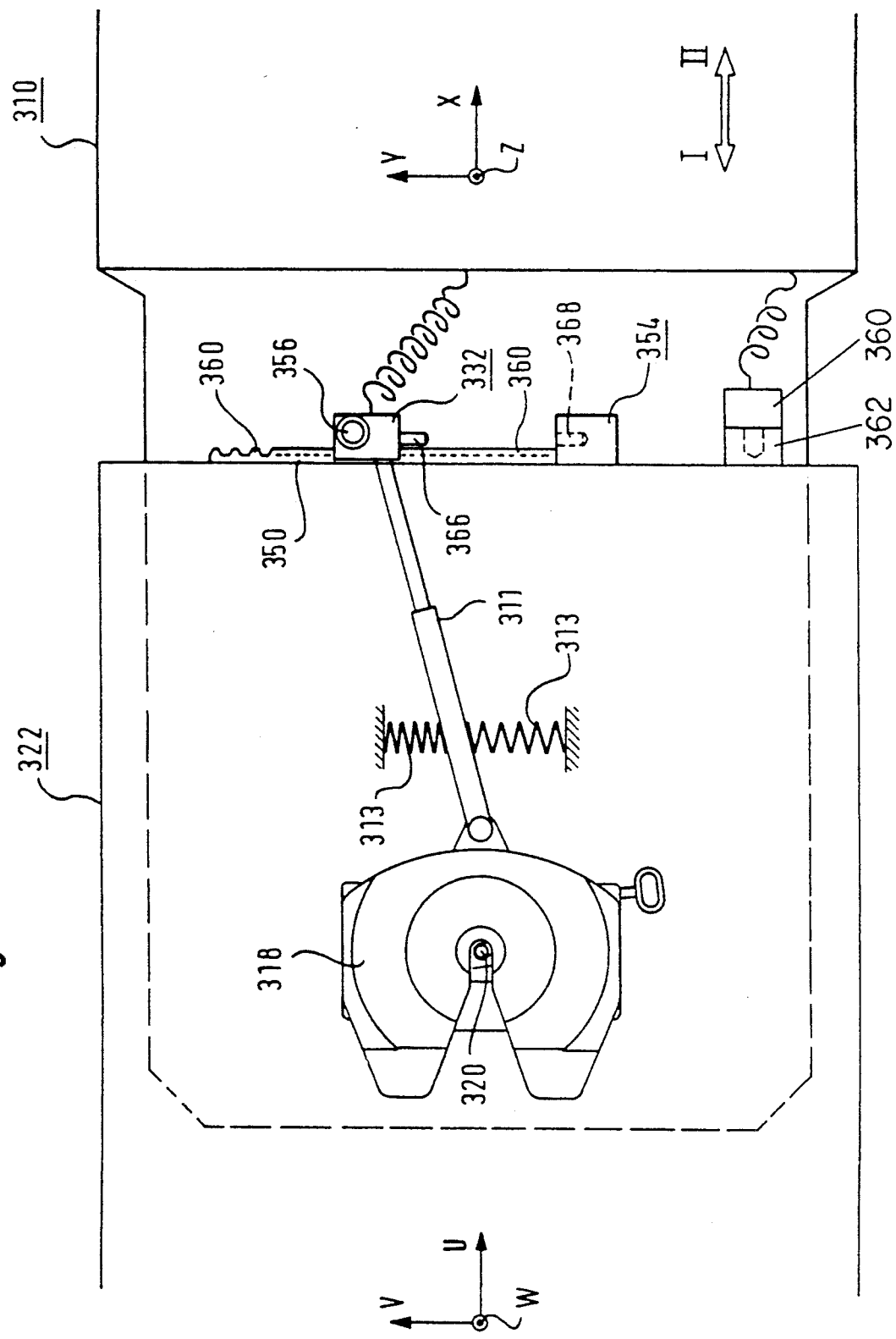
FIG. 10 is a plan view corresponding to that in FIG. 8 but in which the tractor-side coupling half has already been trapped by the catch device on the trailer vehicle and the parts of the articulating coupling, namely the coupling plate and the king pin, are in push-and-pull transmitting engagement.
Figure 11:
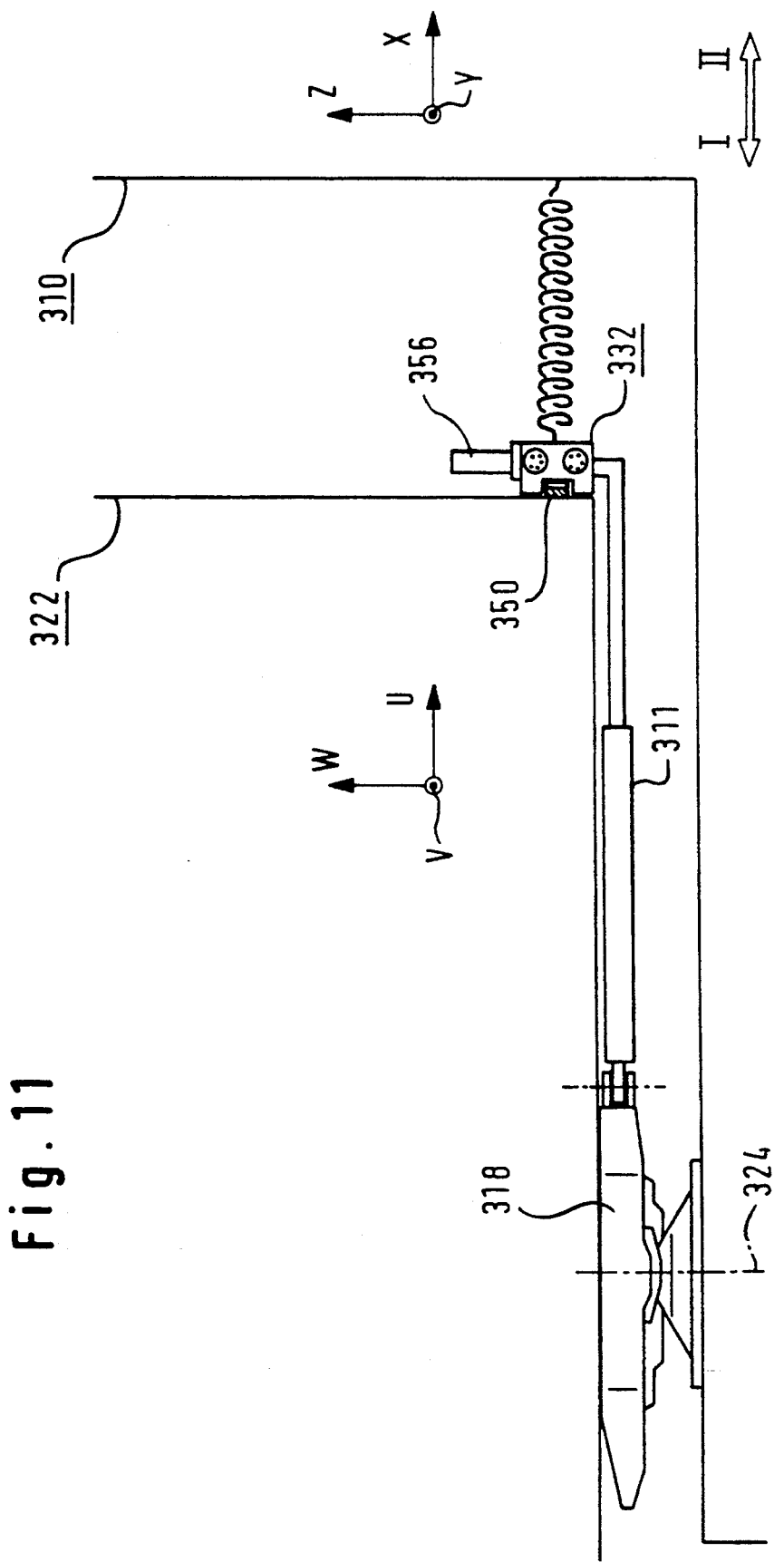
FIG. 11 is a side view of the embodiment shown in FIG. 10.

As previously mentioned, one or more conventional, manually engageable and disengageable coupling pairs 360, 362 may be provided in addition to the aforementioned automatically engageable and disengageable coupling pairs 32, 54; 332, 354 (see FIG. 10).

The invention is basically and preferably applicable to articulated trains. However, it can also be used on other tractor trains which are coupled by means of conventional trailer couplings. For example, the invention can be used with heavy trucks and buses with trailers of conventional construction, for example trailers having at least one rear rigid axle and a front axle which is articulated to a draw bar, the draw bar being coupled by means of a towing bracket to a bolt coupling at the rear end of the truck or bus. A further field of application is that of transport trains consisting of a truck or other tractor vehicle with a conventional trailer coupling and a single-axle or multiple-axle trailer coupled by a rigid draw bar to the trailer coupling of the tractor vehicle.

However, in principle, the invention can also be applied to articulated trains consisting of a motor car with a single-axle or multi-axle trailer coupled to it. Furthermore, the invention can be used in the case of tractor trains in which the trailer vehicle consists of mobile implements, for example an agricultural implement or a building implement.

Preferably, the invention can be applied if the coupling of the tractor coupling is automated, in other words for instance when the tractor coupling can be coupled by a reverse impact on the tractor vehicle.

In conjunction with the proposal according to the invention, it may in particular be of significant importance for all the operations needed when bringing together the tractor train for transport purposes and for separating the tractor train to be capable of being operated from one central control point, particularly from the driver's place in a driver's cab. These operations include not only coupling and separation of the actual tractor coupling but in certain circumstances also the following operations:

extension of stays to support an articulated train trailer and engagement of a brake on an articulated train trailer, extension of a tow bar jack on a single-axle or multiple-axle trailer and engagement of the associated brake, extension of a tow bar jack on a motor car trailer and engagement of an associated brake on the trailer side.

The object of the invention is in fact to ensure that the driver can trigger all the necessary processes when fitting together and separating an articulated train from his normal position or from any other central control position without having to leave this position and in particular without having to enter hazardous areas.

According to the above, on the one hand, the term 'trailer of conventional construction' is understood to be a trailer having at its front end a draw bar provided with a coupling eye for engaging a trailer coupling of the tractor vehicle of the type known from U.S. Pat. No. 4,577,885 and German patent specification published after examination No. 1 095 132, for example.

One type of such conventional trailers has a draw bar adapted to be pivoted about the vertical axis in relation to the trailer and front wheels that may be steered by means of the draw bar, while two or more wheels are mounted on rigid unsteerable axes at the rear end of the trailer. Another type of such conventional trailers has a draw bar rigidly connected to the trailer and one rigid and unsteerable axis or two rigid and unsteerable axes adjacently disposed in succession with respect to the longitudinal direction of the trailer.

On the other hand, the term 'trailer of conventional construction' is understood to mean a trailer having at its front end a draw bar provided with a coupling pan for ball-jointly engaging a ball head of a trailer coupling of the tractor vehicle.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

I claim:

1. A combination of two vehicles (10, 22) comprising:
   a first vehicle (10) with a first-vehicle longitudinal axis (X), a first-vehicle transverse axis (Y), and a first-vehicle vertical axis (Z);
   a second vehicle (22) with a second-vehicle longitudinal axis (U), a second-vehicle transverse axis (V) and a second-vehicle vertical axis (W);
   an articulated coupling means (18, 20) with a coupling axis (24) substantially parallel to one of the vertical axes (Z, W), said coupling means providing a push-and-pull connection between the two vehicles (10, 22);
   a supply unit (64) operatively associated with at least one of said first and second vehicles (10, 22);
   a flexible supply line (62) operatively associated with the supply unit (64);
   a supply-line-coupling means (32, 54) between the two vehicles (10, 22) having a first coupling half (32) on the first vehicle (10) and a second coupling half (54) on the second vehicle (22);
   said at least one flexible supply line (62) permitting, when the first and the second coupling halves (32, 54) are coupled to each other, relative pivoting movements of the vehicles (10, 22) about the coupling axis (24);
   one (32, 54) of the first and the second coupling halves being operatively rigidly disposed on one (10, 22) of the two vehicles, and the other one (32, 54) of the first and the second coupling halves being connected by the flexible supply line (62) to the supply unit (64) of the other one (10, 22) of the two vehicles;
   a positioning means (30) provided on the other one (10, 22) of the two vehicles for positioning the other coupling half (32) on the other one (10, 22) of the two vehicles in a ready-for-capture position when the first and the second vehicles (10, 22) are separated, the positioning means (30) permitting the other one (32, 54) of the first and second coupling halves a freedom of movement with respect to the other one (10, 22) of the two vehicles; and
   a catch device (50) provided on the one (10, 22) of the two vehicles for trapping the other coupling half (32, 54), as positioned in said ready-for-capture position on the other one (10, 22) of the two vehicles, in a catch position in response to an approach movement between the first and the second vehicles (10, 22), whereby the other one (32, 54) of the first and the second coupling halves is received in said catch position by the one (10, 22) of the first and the second vehicles and displaced from the other one (10, 22) of the first and the second vehicles;
   wherein said catch position of the other coupling half (32, 54) corresponds to one of a coupling engagement position of said first and second coupling halves and a location on a transport path defined by the length of the catch device (50) from which the other coupling half is movable to a coupling engagement position of said first and second coupling halves (32, 54), the other coupling half (32, 54) being separated from the positioning means (30) in said coupling engagement position and being attached to the one (10, 22) of the first and the second vehicles in the coupling engagement position, and the first and the second coupling halves (32, 54) remaining coupled while the first and the second vehicles are in common motion.

2. A combination according to claim 1, wherein:
   a first snap engagement means (50, 48) is provided in part on said catch device and in part on the other coupling half, said first snap engagement means being engaged in response to the mutual approach movement between the first vehicle and the second vehicle during the coupling process, a second snap-action engagement means (36, 44) being provided in part on said positioning means and in part on the other coupling half, said second snap engagement means being engaged in response to a mutual separating movement between the first vehicle and the second vehicle, said first snap engagement means (50, 48) and said second snap engagement means (36, 44) having respective snap-in and snap-out resistances such that, in response to the mutual approach movement between the first vehicle and the second vehicle, engagement of said first snap engagement means occurs before disengagement of said second snap engagement means occurs, and, in response to mutual separating movement between the first vehicle and the second vehicle, engagement of said second snap engagement means occurs before disengagement of said first snap engagement means occurs.

3. A combination according to claim 2, wherein:
   said first snap engagement means (50, 48) comprises edge zones of said catch device (50) provided on the one (10, 22) of the two vehicles and edge zones of a U-shaped element (46) of the other coupling half.

4. A combination according to claim 2, wherein:
   at least one of said first snap engagement means (50, 48) and said second snap engagement means (36, 44) is remotely controlled.

5. A combination according to claim 1, wherein:
   said positioning means (30) comprises a positioning fork on the other one of the first and the second vehicles and a fork-engaging pin (36) on the other one of the first and the second coupling halves.

6. A combination according to claim 5, wherein:
   said fork-engaging pin (36) is movable between a first position in which said pin is operative and a second position in which said pin is inoperative.

7. A combination as set forth in claim 1, wherein said positioning means comprises a positioning rail extending substantially along the first-vehicle transverse axis of said first vehicle (10).

8. A combination of two vehicles (310, 322) comprising:
   a first vehicle (310) with a first-vehicle longitudinal axis (X), a first-vehicle transverse axis (Y), and a first-vehicle vertical axis (Z);
   a second vehicle (322) with a second-vehicle longitudinal axis (U), a second-vehicle transverse axis (V) and a second-vehicle vertical axis (W);
   an articulated coupling means (318, 320) with a coupling axis (324) substantially parallel to one of the vertical axes (Z, W), said coupling means providing a push-and-pull connection between the two vehicles (310, 322);
   a supply unit operatively associated with at least one of the first and the second vehicles (310, 322);
   a flexible supply line operatively associated with the supply unit;

a supply-line-coupling means (332, 354) between the two vehicles (310, 322) having a first coupling half (332) on the first vehicle (310) and a second coupling half (354) on the second vehicle (322);

said at least one flexible supply line permitting, when the first and the second coupling halves (332, 354) are coupled to each other, relative pivoting movements of the vehicles (310, 322) about the coupling axis (324);

one (332, 354) of the first and the second coupling halves (332, 354) being operatively rigidly disposed on one (310, 322) of the two vehicles, and the other one (332, 354) of the first and the second coupling halves being connected by the flexible supply line to the supply unit of the other one (310, 322) of the two vehicles;

a positioning means (311) provided on the other one (310, 322) of two vehicles for positioning the other coupling half on the other vehicle (310, 322) in a ready-for-capture position when the first and the second vehicles (310, 322) are separated, the positioning means (311) permitting the other coupling half (332, 354) a freedom of movement with respect to the other one (310, 322) of the two vehicles at least along the corresponding vehicle longitudinal axis of the other one (310, 322) of the two vehicles;

a catch device (350) provided on the one (310, 322) of the two vehicles for trapping the other coupling half (332, 354), as positioned in said ready-for-capture position on the other one (310, 322) of the two vehicles, in a catch position in response to an approach movement between the first and the second vehicles (310, 322), whereby the other one (332, 354) of the first and the second coupling halves is received in said catch position by the one (310, 322) of the first and the second vehicles and displaced with respect to the other one (310, 322) of the first and the second vehicles;

wherein said catch position of the other coupling half (332, 354) corresponds to one of a coupling engagement position and a location on a transport path defined by the length of the catch device (350) from which the other coupling half is movable to a position in which the first and the second coupling halves (332, 354) are coupled, the other coupling half (332, 354) being in said coupling engagement position attached to the one (310, 322) of the two vehicles, the first and the second coupling halves (332, 354) remaining coupled while the first and the second vehicles are in common motion;

the positioning means (311) comprising an elongated carrier member pivotally mounted on the other vehicle (310, 322) at a connecting location (317) about a substantially vertical axis, said substantially vertical axis being displaced from, and parallel with, the coupling axis (324) in a direction opposite to the direction of approach of the other vehicle (310, 322) towards the one (310, 322) of the two vehicles for achieving the push-and-pull connection therewith, the other coupling half (332, 354) being movable in the longitudinal direction of said elongated carrier member and being connected when in at least one of the catch position and the coupling engagement position to said elongated carrier member.

9. A combination according to claim 8, wherein:
a pre-tensioning means (313, 315) is operatively associated with said positioning means (311) for pre-tensioning said positioning means towards a position corresponding to said ready-for-capture position of the other one of the first and the second coupling halves.

10. A combination according to claim 1 or 8, wherein:
a first snap engagement means (48, 50) is provided in part on the catch device (50) and in part on the other coupling half, said first snap engagement means engaging in response to the mutual approach movement between the first vehicle and the second vehicle during the coupling process.

11. A combination according to claim 1 or 8, wherein:
a second snap engagement means (36, 44) is provided in part on said positioning means and in part on the other coupling half, said second snap engagement means being engaged in response to a mutual separating movement between the first vehicle the second vehicle.

12. A combination according to claim 1 or 8, wherein:
the first vehicle and the second vehicle are provided with road wheels.

13. A combination according to claim 1 or 8, wherein:
the catch device and the other coupling half are provided with a catch-device-side engagement means and a coupling-half-side counter engagement means, respectively, said catch-device-side engagement means and said coupling-half-side counter engagement means being released from each other in response to a separating movement of the first vehicle and the second vehicle.

14. A combination according to claim 1 or 8, wherein:
one of the first and the second vehicles is a tractor vehicle, and the other vehicle is a trailer vehicle.

15. A combination according to claim 14, wherein:
a tractor-side coupling unit of said articulated coupling means is provided on said tractor vehicle, said tractor vehicle being further provided with a means for adjusting the height of said tractor-side coupling unit.

16. A combination according to claim 14, wherein:
said articulated coupling means comprises a trailer-side coupling unit provided on the trailer vehicle; and
the trailer vehicle is provided with height-adjustable supporting stays (23).

17. A combination according to claim 14, wherein:
said positioning means is provided on a coupling unit of said articulated coupling means, which coupling unit is associated with said tractor vehicle.

18. A combination according to claim 1 or 8, wherein:
a powered driving means is provided for moving the other coupling half along said transport path.

19. A combination according to claim 1 or 8, wherein:
the other coupling half is transported along said transport path in response to relative movement of the first vehicle and the second vehicle.

20. A combination according to claim 18, wherein:
said powered driving means is operatively coupled to one of said catch device and said other coupling half and is always connected to a power source associated with one of the first and second vehicles.

21. A combination according to claim 18, wherein:
the other coupling half is provided with a driving motor (56) and a pinion (58) driven by said driving motor, said catch device comprising a rack (60), and said pinion (58) being engaged with said rack (60) in response to the other coupling half being trapped by said catch device.

22. A combination according to claim 21, wherein:
the rack (60) comprises a portion of a toothed belt.

23. A combination according to claim 1 or 8, wherein:
the transport path extends in a direction substantially parallel to the second-vehicle transverse axis (V).

24. A combination according to claim 1 or 8, wherein:
the first coupling half and the second coupling half comprise plug-in coupling halves which are coupled along a line extending substantially in parallel with said transport path.

25. A combination according to claim 1 or 8, further comprising:
a position memorizing system for controlling the position of the other coupling half along said transport path.

26. A combination according to claim 1 or 8, further comprising:
a position recognition system for controlling the movement of the other coupling half along said transport path.

27. A combination according to claim 1 or 8, further comprising:
a level correcting means for adjusting said catch device relative to the other coupling half along the vertical direction.

28. A combination according to claim 27, further comprising:
a level difference recognition device for controlling said level correcting means.

29. A combination according to claim 1 or 8, wherein:
a location of the other coupling half is adjustable along the transport path such that the other coupling half can be brought into a repositioning alignment with said positioning means in preparation of separation of the first vehicle from the second vehicle.

30. A combination according to claim 1 or 8, wherein:
said articulated coupling means comprises a first-vehicle coupling unit and a second-vehicle coupling unit;
a coupling unit recognition system is provided for recognizing a relative position of said first-vehicle coupling unit and said second-vehicle coupling unit; and
an adjusting system is provided and is controllable in accordance with said coupling unit recognition system so as to direct said first-vehicle coupling unit and said second-vehicle coupling unit toward a predetermined coupling position.

31. A combination according to claim 1 or 8, wherein:
at least one additional pair of the coupling halves is provided in parallel with said supply line coupling means, the coupling halves of said at least one additional pair of coupling halves being manually engageable with, and disengageable from, each other.

32. A combination according to claim 1 or 8, wherein:
said supply line coupling means is associated with a plurality of supply lines in common.

33. A combination according to claim 1 or 8, further comprising:
a driver's cabin provided on at least one of the first vehicle and the second vehicle; and
a remote control means for facilitating coupling operations of at least one of said articulated coupling means and said supply line coupling means;
wherein said remote control system comprises an actuating means located within said driver's cabin.

34. A combination according to claim 1 or 8, wherein:
the first and the second coupling halves are manually engageable with, and disengageable from, each other.

35. A combination according to claim 1 or 8, wherein:
the other coupling half is movable between said ready-for-capture position and said catch position in a substantially longitudinal direction with respect to said other vehicle in response to the approach movement and separation movement between the first vehicle and the second vehicle.

36. A combination according to claim 1 or 8, wherein:
one of the first and the second vehicles is a fifth-wheel tractor vehicle, and the other vehicle is a fifth-wheel trailer vehicle.

37. A combination according to claim 36, wherein:
said one of the first and the second coupling halves is operatively rigidly disposed on said trailer vehicle, and said positioning means is provided on said fifth-wheel tractor vehicle.

38. A combination according to claim 36, further comprising:
a saddle plate provided on said fifth-wheel tractor vehicle; and
a supporting plate provided on said fifth-wheel trailer vehicle;
wherein said catch device and the other coupling half are at equal height for engaging one another in response to an engagement of said supporting plate and said saddle plate.

39. A combination according to claim 36, wherein:
the positioning means (30) is provided on a saddle plate (18) of the fifth-wheel tractor vehicle (10).

40. A method of coupling two vehicles (10, 22) one behind the other substantially along a common driving direction, the resulting combination comprising a first vehicle (10) with a first-vehicle longitudinal axis (X), a first-vehicle transverse axis (Y), and a first-vehicle vertical axis (Z), a second vehicle (22) with a second-vehicle longitudinal axis (U), a second vehicle transverse axis (V) and a second-vehicle vertical axis (W), an articulated mechanical coupling means (18, 20) with a coupling axis (24) substantially parallel to one of said vertical axes (Z, W), said mechanical coupling means being capable of providing a push-and-pull connection between said two vehicles (10, 22), a supply line coupling means (32, 54) between said two vehicles (10, 22) with a first coupling half (32) on said first vehicle (10) and a second coupling half (54) on said second vehicle (22), at least one (32, 54) of said first and second coupling halves (32, 54) being connected to a supply unit (64) of the respective vehicle (10, 22) by a flexible supply line (62), said flexible supply line (62) permitting, when said first and said second coupling halves (32, 54) are coupled to each other, relative pivoting movements of said two vehicles (10, 22) about said coupling axis (24), one (32, 54) of said first and said second coupling halves (32, 54) being operatively rigidly disposed on one (10, 22) of said two vehicles, the other one (32, 54) of said first and said second coupling halves being connected by said flexible supply line (62) to a supply unit (64) on the other (10, 22) of said two vehicles, said method comprising:
moving said two vehicles (10, 22) toward each other for establishing said push-and-pull connection between said two vehicles (10, 22), respective portions of said two vehicles (10, 22) adjacent to said articulated mechanical coupling means (18, 20) being mutually height-adjusted along said corresponding vehicle vertical axes (Z, W) to accommodate the establishment of said push-and-pull connection;

bringing said first and said second coupling halves (32, 54) into relative positions of substantially equal height in response to said height-adjustment;

moving said other coupling half (32, 54) along an approach path substantially parallel to the corresponding vehicle longitudinal axis of said other vehicle (10, 22) toward a catch device defining a substantially horizontal transport path (50) provided on said one vehicle (10, 22), said transport path being substantially parallel to the corresponding vehicle transverse axis of said one vehicle (10, 22);

transferring said other coupling half (32, 54) to said catch device for movement along said transport path (50);

moving said other coupling half (32, 54) along said transport path (50) toward said one coupling half (32, 54); and coupling said one coupling half with said other coupling half.

41. A method of uncoupling a combination of two vehicles (10, 22) coupled one behind the other substantially along a common driving direction, said combination comprising a first vehicle (10) with a first-vehicle longitudinal axis (X), a first-vehicle transverse axis (Y) and a first-vehicle vertical axis (Z), a second vehicle (22) with a second-vehicle longitudinal axis (U), a second-vehicle transverse axis (V) and a second-vehicle vertical axis (W), an articulated mechanical coupling means (18, 20) with a coupling axis (24) substantially parallel to one of said vertical axes (Z, W), said mechanical coupling means providing a push-and-pull connection between said two vehicles (10, 22), a supply line coupling means (32, 54) between said two vehicles (10, 22) comprising a first coupling half (32) on said first vehicle (10) and a second coupling half (54) on said second vehicle (22), at least one (32) of said first and second coupling halves (32, 54) being connected to a supply unit (64) of the respective vehicle (10, 22) by a flexible supply line (62), said flexible supply line (62) permitting, when said first and said second coupling halves (32, 54) are coupled to each other, relative pivoting movements of said vehicles (10, 22) about said coupling axis (24), at least one (32, 54) of said first and said second coupling halves (32, 54) being operatively rigidly disposed on one (10, 22) of said first and said second vehicles, the other (32, 54) of said first and said second coupling halves being connected by said flexible supply line (62) to a supply unit (64) on the other (10, 22) of said two vehicles, said method of uncoupling comprising:

separating the first and second coupling halves (32, 54) from each other;

moving said other coupling half along a transport path (50) extending on said one vehicle substantially in parallel with said vehicle transverse axis of said one vehicle;

stopping said movement along said transport path (50) when said other coupling half reaches a ready-to-separate position on said transport path (50);

separating the second vehicle (22) from the first vehicle (10);

separating said other coupling half from said transport path (50); and positioning said other coupling half at a predetermined location on said other vehicle.

* * * * *

UNITED STATES PATENT AND TRADEMARK OFFICE
CERTIFICATE OF CORRECTION

PATENT NO. : 5,346,239

DATED : September 13, 1994

INVENTOR(S) : Gerald Wohlhüter

It is certified that error appears in the above-indentified patent and that said Letters Patent is hereby corrected as shown below:

```
Col. 1,  line 22,   "vehicles h" should read --vehicles with--;
Col. 1,  line 25,   "an d" should read --and--;
Col. 1,  line 58,   "couple tube" should read --couple the--;
Col. 2,  line 15,   "there is" should read --is--;
Col. 2,  line 18,   "martial" should read --partial--;
Col. 3,  line 37,   "the partial" should read --the two partial--;
Col. 3,  line 49,   "while" should read --while the--;
Col. 4,  line 24,   "osition" should read --position--;
Col. 5,  line 40,   "or, the" should read --or the--;
Col. 6,  line 63,   "coup ling" should read --coupling--;
Col. 6,  line 68,   "Note" should read --More--;
Col. 7,  line 20,   "be" should read --be a--;
Col. 9,  line 30,   "require d" should read --required--;
Col. 10, line 68,   "trailor" should read --trailer--;
Col. 11, line 1,    "trailor-side" should read --trailer-side--;
Col. 11, line 2,    "trailor-side" should read --trailer-side--;
Col. 11, lines 2-3, "trailor-side" should read --trailer-side--;
Col. 12, line 64,   "a long" should read --along--;
Col. 13, line 33,   "t he" should read --the--;
Col. 13, line 40,   "offer" should read --order--;
Col. 14, line 39,   "arrow Z" should read --arrow I--;
Col. 14, line 41,   "engage d" should read --engaged--;
```

UNITED STATES PATENT AND TRADEMARK OFFICE
CERTIFICATE OF CORRECTION

PATENT NO. : 5,346,239
DATED : September 13, 1994
INVENTOR(S) : Gerald Wohlhüter It is certified that error appears in the above-indentified patent and that said Letters Patent is hereby corrected as shown below:

Col. 15, line 37, "half 322" should read --half 332--;
Col. 18, lines 9-10, "snap-action engagement" should read --snap engagement--;
Col. 20, line 17, "first vehicle" should read --first vehicle and--.

Signed and Sealed this

Tenth Day of January, 1995

BRUCE LEHMAN

Attest:

Attesting Officer

Commissioner of Patents and Trademarks